US012735583B2

(12) United States Patent
Monnard et al.

(10) Patent No.: US 12,735,583 B2
(45) Date of Patent: Sep. 15, 2026

(54) COATINGS COMPRISING ANTIMICROBIAL ACTIVE INGREDIENTS FOR FOOD PACKAGING

(71) Applicant: Omya International AG, Oftringen (CH)

(72) Inventors: Fabien Wilhelm Monnard, Aarburg (CH); Stefanie Waller, Olten (CH); Jan Philipp Weihs, Düdingen (CH); Nadine Rüegg, Zürich (CH); Annica Vanessa Faller, Uetikon am See (CH); Barbara Maria Beck, Triesenberg (LI); Selcuk Yildirim, Wädenswil (CH); Rico Ménard, Jonschwil (CH)

(73) Assignee: Omya International AG, Oftringen (CH)

( * ) Notice: Subject to any disclaimer, the term of this patent is extended or adjusted under 35 U.S.C. 154(b) by 514 days.

(21) Appl. No.: 17/996,795

(22) PCT Filed: May 5, 2021

(86) PCT No.: PCT/EP2021/061821
§ 371 (c)(1),
(2) Date: Oct. 21, 2022

(87) PCT Pub. No.: WO2021/224317
PCT Pub. Date: Nov. 11, 2021

(65) Prior Publication Data

US 2023/0183499 A1 Jun. 15, 2023

(30) Foreign Application Priority Data

May 8, 2020 (EP) .................................... 20173696

(51) Int. Cl.
*C09D 7/61* (2018.01)
*B32B 5/02* (2006.01)
(Continued)

(52) U.S. Cl.
CPC .................. *C09D 7/61* (2018.01); *B32B 5/02* (2013.01); *B32B 7/12* (2013.01); *B32B 27/08* (2013.01);
(Continued)

(58) Field of Classification Search
None
See application file for complete search history.

(56) References Cited

U.S. PATENT DOCUMENTS

2004/0020410 A1 2/2004 Gane et al.
2009/0120571 A1 5/2009 Rasmussen
2018/0327604 A1* 11/2018 Diaz Quijano ...... A61K 9/1617

FOREIGN PATENT DOCUMENTS

EP 1712523 A1 10/2006
EP 1712597 A1 10/2006
(Continued)

OTHER PUBLICATIONS

International Search Report and Written Opinion issued in PCT/EP2021/061821 mailed Sep. 2, 2021.
(Continued)

*Primary Examiner* — Yan Lan
(74) *Attorney, Agent, or Firm* — Heslin Rothenberg Farley & Mesiti P.C.

(57) ABSTRACT

The present invention relates to a sheet-like element suitable for use in a food packaging, comprising a coating layer comprising surface-reacted calcium carbonate. The coating layer is adapted for being loaded with an antimicrobial active composition, such as an essential oil. The present invention further relates to a coating layer comprising surface-reacted calcium carbonate loaded with an antimicrobial active composition suitable for use in a food packaging, as well as to a process for the manufacture of said sheet-like element, a sheet-like element supply device, a food pack-
(Continued)

aging comprising said sheet-like element, the use of said sheet-like element in a food packaging and the use of said sheet-like element for achieving an antimicrobial and/or antifungal and/or anti-mould and/or antifouling effect in a food packaging.

13 Claims, 3 Drawing Sheets

(51) Int. Cl.

| | |
|---|---|
| ***B32B 7/12*** | (2006.01) |
| ***B32B 27/08*** | (2006.01) |
| ***B32B 27/12*** | (2006.01) |
| ***B32B 27/16*** | (2006.01) |
| ***C09D 5/14*** | (2006.01) |

(52) U.S. Cl.

CPC .............. *B32B 27/12* (2013.01); *B32B 27/16* (2013.01); *C09D 5/14* (2013.01); *B32B 2255/10* (2013.01); *B32B 2264/104* (2013.01); *B32B 2307/7145* (2013.01); *B32B 2439/70* (2013.01)

(56) References Cited

FOREIGN PATENT DOCUMENTS

| | | | |
|---|---|---|---|
| EP | 2264108 | A1 | 12/2010 |
| EP | 2264109 | A1 | 12/2010 |
| EP | 2371766 | A1 | 10/2011 |
| EP | 2447213 | A1 | 5/2012 |
| EP | 2524898 | A1 | 11/2012 |
| EP | 3395170 | A1 | 10/2018 |
| NO | 2018019692 | A1 | 2/2018 |
| WO | 0039222 | A1 | 7/2000 |
| WO | 2004083316 | A1 | 9/2004 |
| WO | 2005121257 | A2 | 12/2005 |
| WO | 2009074492 | A1 | 6/2009 |
| WO | 2013142473 | A1 | 9/2013 |
| WO | 2016023937 | A1 | 2/2016 |
| WO | 2017121675 | A1 | 7/2017 |
| WO | 2018019699 | A1 | 2/2018 |
| WO | 2018153786 | A1 | 8/2018 |
| WO | 2018206709 | A1 | 11/2018 |

OTHER PUBLICATIONS

Wen-Xian Du et al., "Antimicrobial volatile essential oils in edible films for food safety," Science against microbial pathogens: communicating current research and technological advances, A. Mendez-Vilas (Ed.), Jan. 2011, pp. 1124-1134.

Cathy J. Ridgway et al., "On bulk density measurement and coating porosity calculation for coated paper samples," Nordic Pulp and Paper Research Journal, 2003, pp. 18, 24-31.

Don W. Green et al., "Perry's Chemical Engineers' Handbook," 9th Ed., pp. 2-61 to 2-75.

Horst Surburg et al., "Common Fragrance and Flavor Materials", 5th Ed., Wiley-VCH Weinheim, 2006, pp. 7-176 and 181-238.

* cited by examiner

COATINGS COMPRISING ANTIMICROBIAL ACTIVE INGREDIENTS FOR FOOD PACKAGING

CROSS REFERENCE TO RELATED APPLICATIONS

This application is a U.S. National Phase filing under 35 U.S.C. § 371 of International Application PCT/EP2021/061821, filed May 5, 2021, and published as WO 2021/224317 A1 on Nov. 11, 2021. PCT/EP2021/061821 claims priority from European patent application number 20173696.4, filed May 8, 2020. The entire contents of each of these prior applications are hereby incorporated herein by reference.

The present invention relates to a sheet-like element suitable for use in a food packaging, comprising a coating layer comprising surface-reacted calcium carbonate. The present invention further relates to a coating layer comprising surface-reacted calcium carbonate loaded with an antimicrobial active composition suitable for use in a food packaging, as well as to a process for the manufacture of said sheet-like element, a sheet-like element supply device, a food packaging comprising said sheet-like element, the use of said sheet-like element in a food packaging and the use of said sheet-like element for achieving an antimicrobial and/or antifungal and/or anti-mould and/or antifouling effect in a food packaging.

Unsafe food containing pathogenic microorganisms, such as harmful bacteria, viruses or parasites, poses a serious health concern. According to the World Health Organization (WHO), unsafe food can cause more than 200 different diseases and affects approximately 600 million people annually, resulting in 420,000 deaths. Therefore, food safety is a key to sustaining life and promoting good health.

At the same time, contamination of food by pathogenic microorganisms decreases the shelf life of the food. However, an increased shelf life of packaged foods is required to meet the demands of a globalized market leading to increased transportation times and logistic flexibility, but also to meet the requirements of the customer to purchase fresh and safe products.

Traditionally, food additives, in particular preservatives and antioxidants, such as sorbates, benzoates, parabens, nitrites, propionates, sulfur dioxide, ascorbic acid, glutathione, or tocopherol, have been added to the foodstuff in order to prevent or retard microbial contamination. These food additives, however, may lead to an off-taste of the foodstuff and/or may cause adverse effects. Furthermore, many customers prefer minimally processed foodstuffs comprising a minimum amount of non-natural additives.

Essential oils have been suggested as antimicrobial active agents of natural origin. However, the essential oils tend to evaporate over time and/or diffuse out of the food packaging. In order to maintain an essential oil-containing atmosphere within the packaging over a sufficient amount of time, it has been common to incorporate the essential oil into a packaging film, from which the essential oil is released into the food packaging atmosphere. Du et al. ("Antimicrobial volatile essential oils in edible films for food safety", in "Science against microbial pathogens: communicating current research and technological advances", A. Mendez-Vilas (Ed.), pp. 1124-1134) provide an overview on edible films comprising essential oils formed by a solution casting process, which may be used as a controlled release matrix in food packagings. EP 3 395 170 A1 discloses a degradable film for packaging fruit and vegetables, comprising a polyolefin and an essential oil, which may be microencapsulated in a cyclodextrin, clay or silica. The degradable film is produced by pressing of the molten polymer mixture.

However, conventional film processing techniques, such as casting, extruding or pressing, are typically performed at high temperatures, e.g., about 200° C. At these temperatures, the stability of essential oils may be negatively affected. In addition thereto, it is difficult to precisely determine the amount of remaining essential oil and the non-decomposed essential oil in the film, which also may negatively influence the required efficacy.

In view of the above, there is still a need for a food packaging allowing for an efficient protection of the food from microbial contamination for an extended storage time by antimicrobial active agents, such as essential oils.

Accordingly, it is an objective of the present invention to provide a food packaging allowing for an efficient protection of the food from microbial contamination by antimicrobial active agents. It is desired that the antimicrobial active agent can be added to the food packaging in a defined amount and by a simple process.

These and other objectives can be solved by the inventive sheet-like element, the inventive coating layer and the inventive process for the manufacture of a sheet-like element.

Figure 1:
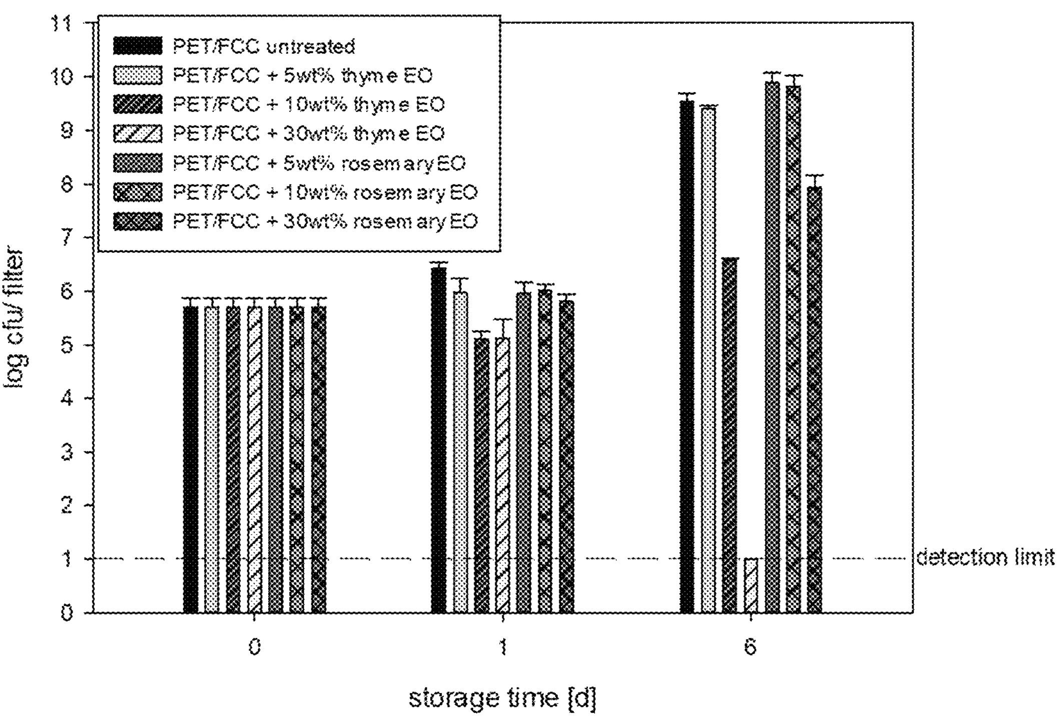
FIG. 1 shows the results from in-vitro antimicrobial activity tests for the sheet-like elements loaded with essential oil with microbiological counts expressed as logarithms of the number of cfu per filter (log cfu/filter).

According to a first aspect of the present invention, a sheet-like element suitable for use in a food packaging is provided. The sheet-like element comprises a) a coating layer comprising a.1) 100 parts by weight of a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, as measured by the BET method, a.2) 0.1 to 10 parts by weight of a dispersant, a.3) 5 to 30 parts by weight of a polymeric binder; and b) a substrate layer, wherein the coating layer has a total intruded specific pore volume in the range from 0.25 to 2 $cm^3/g$, as measured by mercury intrusion porosimetry.

The inventors surprisingly found that the inventive sheet-like element provides a specific porous surface or coating structure due to the interplay of the particulate filler comprising the surface-reacted calcium carbonate, the dispersant and the polymeric binder in the specified amounts. While the surface-reacted calcium carbonate has a high BET surface area and a high porosity and is able to host high amounts of the antimicrobial active composition, the amount of dispersant and binder is critical in order to provide the desired loading, release properties and stability of the antimicrobial active composition during storage of the loaded sheet-like element. It is assumed that the dispersant in the specified amount is able to reduce aggregation of the surface-reacted calcium carbonate while rendering its pores accessible to the antimicrobial active composition. The amount of binder is selected in order to allow for sufficient adhesion and even distribution of the coating layer on the substrate layer. However, the pores of the surface-reacted calcium carbonate need to remain accessible. The inventors found that the resulting specific coating layer according to the present invention is able to absorb suitably high amounts of antimicrobial active compositions. Furthermore, the coating layer of the inventive sheet-like element can be loaded with a defined amount of an antimicrobial active composition by easily applicable methods, e.g., by spraying, coating or dripping. The antimicrobial active composition and/or ingredient also is released in amounts, which provide the desired antimicrobial efficacy.

When the inventive sheet-like element is loaded with an antimicrobial active ingredient or composition and placed in a food packaging, the antimicrobial active ingredient diffuses out of the sheet-like element over an extended time to provide a protective atmosphere, which prevents or retards microbial contamination of the foodstuff. At the same time, the coating layer is physically separated from the foodstuff and does not contaminate the foodstuff, as opposed to a powder of a porous carrier material loaded with the antimicrobial active composition. Said loaded powders tend to be distributed throughout the entire food packaging and also release the antimicrobial active composition comparatively quickly or less continuous. Since the antimicrobial active agent does not have to be processed together with the polymer mixture in an extrusion step in order to incorporate it into the packaging, it is also avoided that the antimicrobial active agent is processed under high temperatures.

A second aspect of the invention relates to a coating layer loaded with an antimicrobial active composition suitable for use in a food packaging. The coating layer comprises a) 100 parts by weight of a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, preferably 50 to 120 $m^2/g$, as measured by the BET method, b) 0.1 to 10 parts by weight of a dispersant, c) 5 to 30 parts by weight of a polymeric binder, and d) an antimicrobial active composition comprising at least one antimicrobial active ingredient preferably having a vapor pressure from 1 to 500 Pa at 25° C. in an amount from 1 to 50 wt.-%, based on the total weight of the coating layer, wherein the coating layer has a total intruded specific pore volume in the range from 0.25 to 2 $cm^3/g$, as measured by mercury intrusion porosimetry.

It is appreciated that the coating layer can be directly applied onto the inner side of a food packaging without a supporting layer and loaded with the antimicrobial active composition. Thus, the inventive coating layer allows for simple and efficient loading of an antimicrobial active composition into a food packaging.

A third aspect of the present invention relates to a process for the manufacture of a sheet-like element suitable for use in a food packaging. The process comprises the steps of:

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, preferably 50 to 120 $m^2/g$, as measured by the BET method, b) providing a dispersant, c) providing a polymeric binder, d) providing a substrate layer comprising one or more individual substrate layers, e) mixing 100 parts by weight of the particulate filler of step a), 0.1 to 10 parts by weight of the dispersant of step b) and 5 to 30 parts by weight of the polymeric binder of step c) to obtain a coating composition, f) applying the coating composition of step e) onto the substrate layer of step d) to form a composite, g) drying the composite obtained in step f) to obtain a sheet-like element, h) optionally adding an antimicrobial active composition comprising at least one antimicrobial active ingredient, preferably having a vapor pressure in the range from 1 to 500 Pa at 25° C., during any one or more of steps a) to g) or after step g) in a total amount from 1 to 50 wt.-%, based on the total weight of the coating layer.

Thus, the antimicrobial active composition, when present, may be added to the sheet-like element after step g). However, the antimicrobial active composition may also be, e.g., loaded onto the particulate filler comprising the surface-reacted calcium carbonate of step a).

In a fourth aspect of the present invention, a sheet-like element supply device comprising the inventive sheet-like element is provided, wherein the supply device preferably comprises a roll or a magazine comprising the sheet-like elements.

Thus, the sheet-like element can be easily dispensed and provided at the point of use.

A fifth aspect of the present invention relates to a food packaging comprising the inventive sheet-like element, wherein the sheet-like element is located within the food packaging, or the inventive coating layer, wherein the coating layer is present within the food packaging.

When the inventive sheet-like element or the inventive coating layer within the food packaging is loaded with an antimicrobial active composition, and said food packaging is used to pack a foodstuff, a protective atmosphere is provided within the food packaging, which prevents or retards spoilage of the foodstuff.

A sixth aspect of the present invention relates to the use of the inventive sheet-like element in a food packaging.

A seventh aspect of the present invention relates to the use of the inventive sheet-like element and/or the inventive coating layer for achieving an antimicrobial and/or antifungal and/or anti-mould and/or antifouling effect in a food packaging.

Thus, the inventive sheet-like element and/or the inventive coating layer comprising the antimicrobial active composition prevents or retards the growth of pathogenic microorganisms in the food packaging.

Advantageous embodiments of the present invention are defined in the corresponding dependent claims.

In a preferred embodiment of any one of the aspects of the present invention, the coating layer has a total intruded specific pore volume in the range from 0.4 to 1.5 $cm^3/g$, preferably from 0.5 to 1.0 $cm^3/g$, as measured by mercury intrusion porosimetry, and/or has a total intra particle intruded specific pore volume in the range from 0.05 to 1.0 $cm^3/g$, preferably from 0.08 to 0.5 $cm^3/g$, and more preferably from 0.1 to 0.4 $cm^3/g$, as measured by mercury intrusion porosimetry, and/or has a total inter particle intruded specific pore volume in the range from 0.05 to 0.5 $cm^3/g$, preferably from 0.08 to 0.4 $cm^3/g$, and more preferably from 0.1 to 0.3 $cm^3/g$, as measured by mercury intrusion porosimetry, and/or has a total occlusion intruded specific pore volume in the range from 0.05 to 0.4 $cm^3/g$, preferably from 0.08 to 0.3 $cm^3/g$, and more preferably from 0.1 to 0.2 $cm^3/g$, as measured by mercury intrusion porosimetry, and/or has a fluid receptivity in the range from 1 to 50 wt.-%, preferably from 10 to 45 wt.-%, based on the total weight of the coating layer, and/or is present on the substrate layer in an amount from 1 to 70 $g/m^2$, preferably 2 to 50 $g/m^2$.

In another preferred embodiment of any one of the aspects of the present invention, the particulate filler comprises the surface-reacted calcium carbonate in an amount of at least 70 wt.-%, preferably at least 90 wt.-%, based on the total weight of the at least one particulate filler, and most preferably the particulate filler consists of the surface-reacted calcium carbonate, and wherein any optionally present further particulate filler material is selected from the group consisting of dolomite, ground calcium carbonate, precipitated calcium carbonate, magnesium hydroxide, talc, gypsum, titanium dioxide, kaolin, silicate, mica, barium sulphate, calcined clay, non-calcined (hydrous) clay, bentonite and mixtures thereof, and preferably is selected from the group consisting of ground calcium carbonate, precipitated calcium carbonate and mixtures thereof, and most preferably wherein the particulate filler consists of the optionally present further particulate filler material and the surface-reacted calcium carbonate.

In yet another preferred embodiment of any one of the aspects of the present invention, the surface-reacted calcium carbonate has a specific surface area in the range from 50 to 120 $m^2/g$, as measured by the BET method, and/or has a total intra particle intruded specific pore volume in the range from 0.1 to 2.5 $cm^3/g$, as measured by mercury intrusion porosimetry.

In still another preferred embodiment of any one of the aspects of the present invention, the dispersant is selected from polyacrylic acid having a molecular weight in the range of 1000 to 15000 g/mol, salts thereof, derivatives thereof, starch, carboxymethyl cellulose or mixtures thereof, preferably the dispersant is a polyacrylic acid being partially or fully neutralized by alkali metal ions, preferably lithium, sodium, potassium and mixtures thereof, and having a molecular weight in the range of 1500 to 6000 g/mol, more preferably the dispersant is a polyacrylic acid being partially or fully neutralized by sodium ions and having a molecular weight in the range of 1500 to 6000 g/mol.

In one embodiment of any one of the aspects of the present invention, the polymeric binder is selected from the group consisting of polyacrylic acid, salts thereof, derivatives thereof, starch, proteins, styrene butadiene latices, polyvinyl alcohol, polyvinyl acetate and mixtures thereof.

In another embodiment of any one of the aspects of the present invention, the substrate layer comprises one or more individual substrate layers selected from the group consisting of polymer material layers, preferably made from polyethylene, polypropylene, polyethylene terephthalate, polylactic acid, polyhydroxybutyrate, polyethylene-2,5-furandicarboxylate, polystyrene or mixtures thereof, fibrous material layers, preferably made from cellulose acetate, viscose, polypropylene, polyethylene terephthalate, polylactic acid, or mixtures thereof, paper layers, cardboard layers, textile layers, nonwoven layers, layers made from bio-based materials, wood layers, bamboo layers, metal foil layers, aluminum layers, print receptive coating layers, and mixtures of the foregoing, wherein the one or more individual substrate layers optionally have been subjected to a corona treatment, and wherein preferably the one or more individual substrate layers is selected from polymer material layers.

In yet another embodiment of any one of the aspects of the present invention, the sheet-like element further comprises:

one or more adhesive layers, being located on the substrate layer on the opposite side of the coating layer and/or between the individual substrate layers, wherein the adhesive layer preferably is selected from the group consisting of adhesives, sealants, rubber coatings, pressure-sensitive layers and mixtures of the foregoing; and/or one or more primer layers, being located between the substrate layer and the coating layer, and/or one or more breathable covering layers to permanently cover the coating layer, preferably selected from the group consisting of breathable film layers, fibrous material layers and nonwoven fabric layers, and/or one or more protective layers to temporarily seal the coating layer, and/or the adhesive layer, preferably selected from polyethylene, polypropylene and/or coated paper.

In an especially preferred embodiment of any one of the aspects of the present invention, the sheet-like element further comprises an antimicrobial active composition comprising at least one antimicrobial active ingredient preferably having a vapor pressure in the range from 1 to 500 Pa at 25° C., preferably from 10 to 400 Pa at 25° C., more preferably from 25 to 300 Pa at 25° C., wherein preferably the sheet-like element comprises the antimicrobial active composition in an amount from 1 to 50 wt.-%, based on the total weight of the coating layer.

Preferably, the antimicrobial active composition comprises at least one essential oil, wherein the essential oil preferably is selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof, and/or further comprises at least one viscosity modifier, preferably selected from the group consisting of guar gum, starch, cellulose, carboxymethyl cellulose, locust bean gum, xanthan gum, pectin, carrageenan, agar, salts thereof, derivatives thereof and mixtures thereof.

In a preferred embodiment of the process of the present invention, mixing step e) is performed in the presence of a solvent, preferably water, and/or application step f) is performed by means of roller coating, dip coating, grooved rod coating, curtain coating, stiff blade coating, applicator roll coating, fountain coating, jet coating, short dwell coating, slotted die coating, bent blade coating, bevel blade coating, air knife coating, bar coating, gravure coating, conventional or metering size press coating, spray application techniques, and/or wet stack coating, preferably roller coating, and/or drying step g) is performed at a temperature in the range from 50 to 150° C. at ambient pressure, or at reduced pressure, preferably by hot air drying, IR radiation drying or UV radiation drying, and/or addition step h) is performed by inkjet printing, spraying, coating, vapor deposition, and/or dripping, on at least a part of the surface of the coating layer.

It should be understood that for the purposes of the present invention, the following terms have the following meanings.

For the purposes of the present invention, the sheet-like element being "suitable for use in a food packaging" means that the sheet-like element, when placed in the food packaging, does not negatively affect the edibility of the foodstuff contained in the food packaging. Thus, any compound used in the sheet-like element of the present invention is a food-safe compound, i.e., a compound that does not release any or any significant amounts of toxic or noxious substances or pathogenic microorganisms into the foodstuff.

A "pathogenic microorganism" is understood to be at least one strain of bacteria and/or at least one strain of yeast and/or at least one strain of mould, which may be present in a foodstuff that, when ingested, may cause a foodborne illness.

A "surface-reacted calcium carbonate" according to the present invention is a reaction product of ground natural calcium carbonate (GNCC) or precipitated calcium carbonate (PCC) treated with carbon dioxide and one or more H3O+ ion donors, wherein the carbon dioxide is formed in situ by the H3O+ ion donors treatment and/or is supplied from an external source. An H3O+ ion donor in the context of the present invention is a Brønsted acid and/or an acid salt.

The "particle size" of surface-reacted calcium carbonate herein, if not explicitly stated otherwise, is described as volume-based particle size distribution dx(vol), or dx. Therein, the value dx(vol) represents the diameter relative to which x % by volume of the particles have diameters less than dx(vol). This means that, for example, the d20 (vol) value is the particle size at which 20 vol. % of all particles are smaller than that particle size. The d50 (vol) value is thus the volume median particle size, also referred to as average particle size, i.e. 50 vol. % of all particles are smaller than that particle size and the d98 (vol) value, referred to as volume-based top cut particle size, is the particle size at which 98 vol. % of all particles are smaller than that particle size. If a particle size is given herein as weight-based particle size, then, e.g., the d20 (wt) value is the particle size at which 20 wt.-% of all particles are smaller than that particle size. The d50 (wt) value is thus the volume median particle size, also referred to as weight median particle size, i.e. 50 wt.-% of all particles are smaller than that particle size and the d98 (wt) value, referred to as weight-based top cut particle size, is the particle size at which 98 wt.-% of all particles are smaller than that particle size.

The "porosity" or "pore volume", when used in connection with the particulate filler and the surface-reacted calcium carbonate, refers to the intra particle intruded specific pore volume. The term "porosity" or "pore volume", when used in connection with the coating layer, refers to the total intruded specific pore volume being the sum of the total intra particle intruded specific pore volume, the total inter particle intruded specific pore volume and the total occlusion intruded specific pore volume.

In the context of the present invention, the term "pore" is to be understood as describing the space that is found between and/or within particles, i.e. that is formed by the particles as they pack together under nearest neighbour contact (interparticle pores), such as in a powder, a compact or a coating layer, and/or the void space within porous particles (intraparticle pores), and that allows the passage of liquids under pressure when saturated by the liquid and/or supports absorption of surface wetting liquids.

Throughout the present document, the term "specific surface area" (in m2/g), which is used to define surface-reacted calcium carbonate or other materials, refers to the specific surface area as determined by using the BET method (using nitrogen as adsorbing gas), according to ISO 9277: 2010.

The unit "parts by weight" designates relative amounts of the respective components in a composition, e.g., in the coating layer. That is, a composition comprising, e.g., 100 parts by weight of particulate filler, 1 part by weight of a dispersant and 5 parts by weight of a polymeric binder, comprises the particulate filler, the dispersant and the polymeric binder in the weight ratio 100:1:5. This ratio is neither influenced by the absolute amount of the particulate filler, based on the total weight of the composition, nor by the presence of other components in the composition. Thus, for the purposes of the present invention, any composition comprising a particulate filler is considered to comprise 100 parts by dry weight of the particulate filler. In other words, all amounts of the dispersant, the binder and further additives in parts by weight are given relative to 100 parts by weight of the particulate filler.

The "fluid receptivity" of a coating layer should be understood as the amount of fluid, e.g., essential oil, which the coating layer can absorb without leaking of the fluid or delamination of the coating layer at room temperature. The fluid receptivity is determined visually. The fluid receptivity is given in wt.-%, and refers to the weight of the fluid per weight of the coating layer. Preferably, the fluid is rosemary essential oil.

In the meaning of the present invention, an "antimicrobial active composition" or an "antimicrobial active ingredient" refers to a composition or an ingredient, which, when placed in a food packaging comprising a foodstuff, is effective against pathogenic microorganisms, i.e., at least one strain of bacteria and/or at least one strain of yeast and/or at least one strain of mould in the foodstuff. The term "effective" refers to the ability of the composition or the ingredient to reduce the total number and/or to prevent or reduce the growth or accumulation of at least one strain of bacteria and/or at least one strain of yeast and/or at least one strain of mould in the foodstuff.

According to the present invention, the wording "reduce the total number" means that a reduction in the total number of pathogenic microorganisms, i.e., at least one strain of bacteria and/or at least one strain of yeast and/or at least one strain of mould is observed in the foodstuff compared to the foodstuff in the food packaging not comprising the antimicrobial composition or ingredient. The total number of pathogenic microorganisms, i.e., at least one strain of bacteria and/or at least one strain of yeast and/or at least one strain of mould can be measured using standard microbiological techniques known to the skilled person and can be measured, for example, by plate-out on a tryptic soy agar (TSA) as described in the example section.

According to the present invention, the wording "prevent or reduce the growth or accumulation" means that no significant growth or accumulation of at least one strain of bacteria and/or at least one strain of yeast and/or at least one strain of mould is observed in the foodstuff.

As used throughout the present document, the term "vapor pressure" refers to the saturation vapor pressure of a chemical compound, i.e., the pressure exerted by a vapor in thermodynamic equilibrium with its condensed phases (solid or liquid) at 25° C. in a closed system. The vapor pressure can be measured according to ASTM E1194-17 and ASTM D2879-18. Alternatively, the vapor pressure of certain pure compounds, such as selected antimicrobial active ingredients can be determined by extrapolation using the Antoine equation from the values given in standard reference books, such as in D. W. Green and M. Z. Southard, "Perry's Chemical Engineers' Handbook", 9th Ed., pages 2-61 to 2-75.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that, e.g., an embodiment must be obtained by, e.g., the sequence of steps following the term "obtained" even though such a limited understanding is always included by the terms "obtained" or "defined" as a preferred embodiment.

When in the following reference is made to preferred embodiments or technical details of the sheet-like element, it is to be understood that these preferred embodiments or technical details also refer to the inventive coating layer, the inventive process for the manufacture of a sheet-like element, the inventive food packaging comprising the sheet-like element, the use of the inventive sheet-like element in a food packaging, and the use of the inventive sheet-like element for achieving an antimicrobial and/or antifungal and/or anti-mould and/or antifouling effect in a food packaging.

The Surface-Reacted Calcium Carbonate

The inventive sheet-like element, the inventive coating layer, the inventive process, the inventive food packaging, and the inventive uses make use of a surface-reacted calcium carbonate.

The surface-reacted calcium carbonate is a reaction product of natural ground calcium carbonate or precipitated calcium carbonate with carbon dioxide and one or more H3O+ ion donors, wherein the carbon dioxide is formed in situ by the H3O+ ion donors treatment and/or is supplied from an external source.

A H3O+ ion donor in the context of the present invention is a Brønsted acid and/or an acid salt.

In a preferred embodiment of the invention the surface-reacted calcium carbonate is obtained by a process comprising the steps of: (a) providing a suspension of natural or precipitated calcium carbonate, (b) adding at least one acid having a pKa value of 0 or less at 20° C. or having a pKa value from 0 to 2.5 at 20° C. to the suspension of step (a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous CO2, (D) contacting said natural or precipitated calcium carbonate of step (A) with the at least one acid of step (B) and with the CO2 of step (C), characterised in that: (i) the at least one acid of step B) has a pKa of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a pKa of greater than 7 at 20° C., associated with the ionisation of the first available hydrogen, and the salt anion of which is capable of forming water-insoluble calcium salts, is additionally provided.

"Natural ground calcium carbonate" (GCC) preferably is selected from calcium carbonate containing minerals selected from the group comprising marble, chalk, limestone and mixtures thereof. Natural calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, obtained by precipitation following the reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP2447213 A1, EP2524898 A1, EP2371766 A1, EP1712597 A1, EP1712523 A1, or WO2013142473 A1.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one H3O+ ion donor by the same means as used for grinding natural calcium carbonate as described above.

According to one embodiment of the present invention, the natural or precipitated calcium carbonate is in form of particles having a weight median particle size d50 of 0.05 to 10.0 μm, preferably 0.2 to 5.0 μm, more preferably 0.4 to 3.0 μm, most preferably 0.6 to 1.2 μm, especially 0.7 μm. According to a further embodiment of the present invention, the natural or precipitated calcium carbonate is in form of particles having a weight-based top cut particle size d98 of 0.15 to 55 μm, preferably 1 to 40 μm, more preferably 2 to 25 μm, most preferably 3 to 15 μm, especially 4 μm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more H3O+ ion donor used for the preparation of surface reacted calcium carbonate may be any strong acid, medium-strong acid, or weak acid, or mixtures thereof, generating H3O+ ions under the preparation conditions. According to the present invention, the at least one H3O+ ion donor can also be an acidic salt, generating H3O+ ions under the preparation conditions.

According to one embodiment, the at least one H3O+ ion donor is a strong acid having a pKa of 0 or less at 20° C.

According to another embodiment, the at least one H3O+ ion donor is a medium-strong acid having a pKa value from 0 to 2.5 at 20° C. If the pKa at 20° C. is 0 or less, the acid is preferably selected from sulphuric acid, hydrochloric acid, or mixtures thereof. If the pKa at 20° C. is from 0 to 2.5, the H3O+ ion donor is preferably selected from H2SO3, H3PO4, oxalic acid, or mixtures thereof. The at least one H3O+ ion donor can also be an acidic salt, for example, HSO4− or H2PO4−, being at least partially neutralized by a corresponding cation such as Li+, Na+ or K+, or HPO42−, being at least partially neutralised by a corresponding cation such as Li+, Na+, K+, Mg2+ or Ca2+. The at least one H3O+ ion donor can also be a mixture of one or more acids and one or more acidic salts.

According to still another embodiment, the at least one H3O+ ion donor is a weak acid having a pKa value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a pKa of greater than 7, when measured at 20° C., associated with the ionisation of the first available hydrogen, and the salt anion of which is capable of forming water-insoluble calcium salts, is additionally provided. According to the preferred embodiment, the weak acid has a pKa value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one H3O+ ion donor is selected from the group consisting of hydrochloric acid, sulphuric acid, sulphurous acid, phosphoric acid, citric acid, oxalic acid, acetic acid, formic acid, and mixtures thereof. Preferably the at least one H3O+ ion donor is selected from the group consisting of hydrochloric acid, sulphuric acid, sulphurous acid, phosphoric acid, oxalic acid, H2PO4−, being at least partially neutralised by a corresponding cation such as Li+, Na+ or K+, HPO42−, being at least partially neutralised by a corresponding cation such as Li+, Na+, K+, Mg2+, or Ca2+ and mixtures thereof, more preferably the at least one acid is selected from the group consisting of hydrochloric acid, sulphuric acid, sulphurous acid, phosphoric acid, oxalic acid, or mixtures thereof, and most preferably, the at least one H3O+ ion donor is phosphoric acid.

The one or more H3O+ ion donor can be added to the suspension as a concentrated solution or a more diluted solution. Preferably, the molar ratio of the H3O+ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the H3O+ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the H3O+ ion donor treatment of the natural or precipitated calcium carbonate, the carbon dioxide is automatically formed. Alternatively or additionally, the carbon dioxide can be supplied from an external source.

H3O+ ion donor treatment and treatment with carbon dioxide can be carried out simultaneously which is the case when a strong or medium-strong acid is used. It is also possible to carry out H3O+ ion donor treatment first, e.g. with a medium strong acid having a pKa in the range of 0 to 2.5 at 20° C., wherein carbon dioxide is formed in situ, and thus, the carbon dioxide treatment will automatically be carried out simultaneously with the H3O+ ion donor treatment, followed by the additional treatment with carbon dioxide supplied from an external source.

In a preferred embodiment, the H3O+ ion donor treatment step and/or the carbon dioxide treatment step are repeated at least once, more preferably several times. According to one embodiment, the at least one H3O+ ion donor is added over a time period of at least about 5 min, preferably at least about 10 min, typically from about 10 to about 20 min, more preferably about 30 min, even more preferably about 45 min, and sometimes about 1 h or more.

Subsequent to the H3O+ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with H3O+ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by H3O+ ions, where said H3O+ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said H3O+ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the one or more H3O+ ion donors and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the one or more H3O+ ion donors and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with the one or more H3O+ ion donors and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses and salts thereof.

Alternatively, the aqueous suspension described above can be dried, thereby obtaining the solid (i.e. dry or containing as little water that it is not in a fluid form) surface-reacted natural or precipitated calcium carbonate in the form of granules or a powder.

The surface-reacted calcium carbonate has a BET specific surface area of 20 to 200 m2/g, preferably 50 to 120 m2/g and more preferably 50 to 100 m2/g, measured using the BET method. The BET specific surface area in the meaning of the present invention is defined as the surface area of the particles divided by the mass of the particles. As used therein the specific surface area is measured by adsorption using the BET isotherm (ISO 9277:2010) using nitrogen gas and is specified in m2/g.

It is furthermore preferred that the surface-reacted calcium carbonate has a volume median particle size d50 (vol) of 0.1 to 75 μm, preferably from 0.5 to 50 μm, more preferably from 1 to 40 μm, even more preferably from 1.2 to 30 μm, and most preferably from 1.5 to 15 μm.

It may furthermore be preferred that the surface-reacted calcium carbonate has a volume top cut particle size d98 (vol) of from 0.2 to 150 μm, preferably from 1 to 100 μm, more preferably from 2 to 80 μm, even more preferably from 2.4 to 60 μm, and most preferably from 3 to 30 μm.

Preferably, the surface-reacted calcium carbonate has an intra-particle intruded specific pore volume in the range from 0.1 to 2.5 cm3/g, more preferably from 0.2 to 2.2 cm3/g, still more preferably from 0.4 to 2.0 cm3/g and most preferably from 0.6 to 1.8 cm3/g, determined by mercury porosimetry measurement.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~4 nm). The equilibration time used at each pressure step is 20 seconds. The sample material is sealed in a 5 cm3 chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

In an exemplary embodiment, the surface-reacted calcium carbonate has a BET specific surface area of 20 to 200 m2/g, preferably 50 to 120 m2/g and more preferably 50 to 100 m2/g, and a volume median particle size d50 (vol) of 0.1 to 75 μm, preferably from 0.5 to 50 μm, more preferably from 1 to 40 μm, even more preferably from 1.2 to 30 μm, and most preferably from 1.5 to 15 μm.

In a particularly preferred embodiment of the present invention, the surface-reacted calcium carbonate is a reaction product of natural ground calcium carbonate with carbon dioxide and one or more H3O+ ion donors, wherein the carbon dioxide is formed in situ by the H3O+ ion donors treatment and/or is supplied from an external source, and wherein the one or more H3O+ ion donor is phosphoric acid.

Thus, in an exemplary embodiment of the present invention, the surface-reacted calcium carbonate is a reaction product of natural ground calcium carbonate with carbon dioxide and one or more H3O+ ion donors, wherein the carbon dioxide is formed in situ by the H3O+ ion donors treatment and/or is supplied from an external source, and wherein the one or more H3O+ ion donor is phosphoric acid, and wherein the surface-reacted calcium carbonate has a BET specific surface area of 20 to 200 m2/g, preferably 50 to 120 m2/g and more preferably 50 to 100 m2/g, and a volume median particle size d50 (vol) of 0.1 to 75 μm, preferably from 0.5 to 50 μm, more preferably from 1 to 40 μm, even more preferably from 1.2 to 30 μm, and most preferably from 1.5 to 15 μm.

It is appreciated that the surface-reacted calcium carbonate can be one or a mixture of different kinds of surface-reacted calcium carbonate(s). In one embodiment of the present invention, the surface-reacted calcium carbonate comprises, preferably consists of, one kind of surface-reacted calcium carbonate. Alternatively, the surface-reacted calcium carbonate comprises, preferably consists of, two or more kinds of surface-reacted calcium carbonates. For example, the surface-reacted calcium carbonate comprises, preferably consists of, two or three kinds of surface-reacted calcium carbonates. Preferably, the surface-reacted calcium carbonate comprises, more preferably consists of, one kind of surface-reacted calcium carbonate.

It is to be understood that the surface-reacted calcium carbonate as described herein comprises pores, which, when present in the inventive coating layer of any of the aspects of the invention, are accessible to the antimicrobial active composition. It is believed that the intra particle pores, inter particle pores and coarse agglomerate pores of the surface-reacted calcium carbonate are essentially retained in the specific coating layer according to the present invention, thus, allowing for a high uptake of the antimicrobial active ingredient. Thus, the inventive coating layer may host suitably high amounts of the antimicrobial active composition.

The Particulate Filler

The inventive sheet-like element, the inventive coating layer, the inventive process, the inventive food packaging, and the inventive uses make use of a particulate filler. The particulate filler comprises a surface-reacted calcium carbonate in an amount of at least 50 wt.-%, based on the total amount of the particulate filler. The surface-reacted calcium carbonate is as defined hereinabove.

In a preferred embodiment of the present invention, the particulate filler comprises the surface-reacted calcium carbonate in an amount of at least 70 wt.-%, preferably at least 90 wt. %, based on the total weight of the at least one particulate filler, and most preferably the particulate filler consists of the surface-reacted calcium carbonate.

Consequently, the particulate filler comprises at most 50 wt.-%, preferably at most 30 wt.-%, and more preferably at most 10 wt.-% of at least one further particulate filler material. It is preferred that the at least one further particulate filler material has a weight median particle size d50 in the range from 0.1 to 75 μm, preferably from 0.5 to 50 μm, more preferably from 1 to 40 μm, even more preferably from 1.2 to 30 μm, and most preferably from 1.5 to 15 μm.

In another embodiment of the present invention, the particulate filler comprises a surface-reacted calcium carbonate in an amount of at least 50 wt.-%, based on the total amount of the particulate filler, and comprises at least one further particulate filler material selected from the group consisting of dolomite, ground calcium carbonate, precipitated calcium carbonate, magnesium hydroxide, talc, gypsum, titanium dioxide, kaolin, silicate, mica, barium sulphate, calcined clay, non-calcined (hydrous) clay, bentonite and mixtures thereof. Preferably, the at least one further particulate filler material is selected from ground calcium carbonate, precipitated calcium carbonate and mixtures thereof. In said embodiment, it is particularly preferred that the particulate filler consists of the at least one further particulate filler material and the surface-reacted calcium carbonate. Thus, the particulate filler preferably consists of the surface-reacted calcium carbonate in an amount of at least 50 wt.-%, preferably at least 70 wt.-%, more preferably at least 90 wt.-%, based on the total amount of the particulate filler, and the at least one further particulate filler material selected from ground calcium carbonate, precipitated calcium carbonate and mixtures thereof.

According to one embodiment of the present invention, the ground calcium carbonate or precipitated calcium carbonate is in form of particles having a weight median particle size d50 of 0.05 to 10.0 μm, preferably 0.2 to 5.0 μm, more preferably 0.4 to 3.0 μm, most preferably 0.6 to 1.2 μm, especially 0.7 μm. According to a further embodiment of the present invention, the natural or precipitated calcium carbonate is in form of particles having a weight-based top cut particle size d98 of 0.15 to 55 μm, preferably 1 to 40 μm, more preferably 2 to 25 μm, most preferably 3 to 15 μm, especially 4 μm.

The Dispersant

The inventive sheet-like element and the inventive coating layer contain a dispersant.

In one embodiment of the present invention, the dispersant is selected from the group comprising homopolymers or copolymers of a polycarboxylic acid and/or a salt and/or derivative thereof, based on, for example, acrylic acid, methacrylic acid, maleic acid, fumaric acid or itaconic acid and acrylamide or mixtures thereof. Homopolymers or copolymers of acrylic acid and/or a salt and/or derivative thereof are especially preferred. The molecular weight Mw of such products is preferably in the range of 1000 to 15000 g/mol, with a molecular weight Mw of 1500 to 6000 g/mol being especially preferred. The molecular weight of the dispersants is selected so that they do not act as a binder but instead act as a parting compound. The polymers and/or copolymers may be neutralized with monovalent and/or polyvalent cations or they may have free acid groups. Suitable monovalent cations include, for example, sodium, lithium, potassium or ammonium. Suitable polyvalent cations include, for example, calcium, magnesium, strontium or aluminum. The combination of sodium and magnesium is especially preferred.

In another embodiment of the present invention, the dispersant is selected from the group comprising starch, carboxymethyl cellulose, glycols, polyglycols, e.g., polyethylene glycols, ethylene oxide-propylene oxide-ethylene oxide block copolymers sodium polyphosphates and/or polyaspartic acid as well as their alkali and/or alkaline earth salts, sodium citrate and amines, alkanolamines, such as triethanolamine and triisopropanolamine and mixtures thereof. It is also possible to use other monomers or polymer additives such as ethylene-acrylic acid copolymers alone or in combination. The ratio of acrylic acid monomers in the copolymer with ethylene monomers is preferably 1:4 to 1:50, especially preferably 1:4 to 1:10, particularly 1:5. Dispersants based on organometallic compounds may also be employed. However, it is also possible to use any other dispersant.

In a preferred embodiment of the present invention, the dispersant is selected from polyacrylic acid having a molecular weight in the range of 1000 to 15000 g/mol, salts thereof, derivatives thereof, starch, carboxymethyl cellulose or mixtures thereof. More preferably, the dispersant is polyacrylic acid being partially or fully neutralized by alkali metal ions, such as lithium, sodium, potassium, cesium, and mixtures thereof, preferably sodium and having a molecular weight in the range of 1500 to 6000 g/mol.

For the purposes of the present invention, the term "partially neutralized" means that at least 10 mol-%, preferably at least 25 mol-%, more preferably at least 50 mol-% of the hydrogen atoms of the carboxylic groups of the polyacrylic acid are replaced by alkali metal ions. For the purposes of the present invention, the term "fully neutralized" means that at least 90 mol %, preferably at least 95 mol %, more preferably at least 98 mol %, and most preferably at least 99 mol-% of the hydrogen atoms of the carboxylic groups of the polyacrylic acid are replaced by alkali metal ions.

Most preferably, the dispersant is polyacrylic acid being partially or fully neutralized by sodium ions and having a molecular weight in the range of 1500 to 6000 g/mol.

The dispersant is contained in the coating layer of any one of the aspects of the present invention in an amount from 0.1 to 10 parts by weight, preferably 1 to 5 parts by weight, and more preferably from 1.5 to 3 parts by weight. Alternatively, the dispersant is contained in the coating layer of any one of the aspects of the present invention in an amount from 1.5 to 10 parts by weight. Throughout the present document, the amount is given relative to 100 parts by weight of the particulate filler. Thus, a composition (e.g., a coating layer or a coating composition) comprising, e.g., 5 parts by weight of the dispersant, comprises the dispersant and the particulate filler in a weight ratio of 5:100.

The dispersant is contained in the coating layer in order to disperse the particulate filler comprising the surface-reacted calcium carbonate evenly throughout the coating layer and in order to reduce the amount of aggregates of the particulate filler comprising the surface-reacted calcium carbonate. At the same time, the specified amount ensures that pores of the surface-reacted calcium carbonate remain accessible for the antimicrobial active composition to a large extent. In a preferred embodiment of the present invention, the dispersant is selected from polyacrylic acid having a molecular weight in the range of 1000 to 15000 g/mol, salts thereof, derivatives thereof, starch, carboxymethyl cellulose or mixtures thereof, more preferably the dispersant is a polyacrylic acid being partially or fully neutralized by alkali metal ions, preferably lithium, sodium, potassium, and mixtures thereof, and having a molecular weight in the range of 1500 to 6000 g/mol, most preferably the dispersant is a polyacrylic acid being partially or fully neutralized by sodium ions and having a molecular weight in the range of 1500 to 6000 g/mol, and the dispersant is contained in the coating layer of any one of the aspects of the present invention in an amount from 1 to 5 parts by weight, and more preferably from 1.5 to 3 parts by weight.

The Polymeric Binder

The inventive sheet-like element and the inventive coating layer contain a polymeric binder.

Any suitable polymeric binder may be used in the coating layer of the invention, wherein the binder according to the present invention should preferably be swellable. The skilled person knows how to provide suitable swellable binders, e.g., swellable latices. The binder should be selected such that the pores of the surface-reacted calcium carbonate are not clogged and remain accessible to the antimicrobial active composition.

For example, the polymeric binder may be a hydrophilic polymer such as, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulfonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, alginate or rhamsan and mixtures thereof. It is also possible to use other binders such as hydrophobic materials, for example, poly (styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof. Further examples of suitable binders are homopolymers or copolymers of acrylic and/or methacrylic acids, itaconic acid, and acid esters, such as e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof.

In a preferred embodiment of the present invention, the polymeric binder is an alkali-swellable binder. For the purposes of the present invention, an alkali-swellable binder is understood to be a polymeric binder which, upon increasing the pH value, shows a significant increase in its Brookfield viscosity. Preferably, the viscosity of an aqueous solution comprising 50 wt.-% of the alkali-swellable binder, based on the total weight of the aqueous solution, and having a pH of 4, increases by at least 100%, preferably by at least 250%, more preferably by at least 500%, and most preferably by at least 750%, when measured by a Brookfield DV III Ultra viscometer at 24° C.±3° C. at 100 rpm using an appropriate spindle of the Brookfield RV-spindle set, if the pH value of the aqueous solution is increased from 4 to 10. A preferred alkali-swellable binder is polyacrylic acid or a salt or derivative thereof.

According to a preferred embodiment, the polymeric binder is selected from polyacrylic acid, salts thereof, derivatives thereof, starch, proteins, polyvinyl alcohol, styrene-butadiene latex, styrene-acrylate, polyvinyl acetate, polyolefines, ethylene acrylate, microfibrillated cellulose, microcrystalline cellulose, nanocellulose, cellulose, carboxymethylcellulose, bio-based latex, or mixtures thereof, and more preferably the polymeric binder is selected from the group consisting of polyacrylic acid, salts thereof, derivatives thereof, starch, proteins, styrene butadiene latex, polyvinyl alcohol, polyvinyl acetate and mixtures thereof, and most preferably the polymeric binder is polyacrylic acid or a salt or derivative thereof.

The polymeric binder is contained in the coating layer of any one of the aspects of the present invention in an amount from 5 to 30 parts by weight, preferably 5 to 20 parts by weight, and more preferably from 8 to 15 parts by weight. Herein, the amount is given relative to 100 parts by weight of the particulate filler. Thus, a composition (e.g., a coating layer or a coating composition) comprising, e.g., 10 parts by weight of the polymeric binder, comprises the polymeric binder and the particulate filler in a weight ratio of 10:100.

The polymeric binder is added in order to obtain a coating layer that can be evenly distributed on the substrate layer and adheres to the substrate layer. The amount of polymeric binder, which is added, is chosen high enough to allow for sufficient cohesion and adhesion of the layer, but low enough not to block or clog the pores of the surface-reacted calcium carbonate. In order to further improve adhesion, a primer layer may be provided between the substrate layer and the coating layer, as will be described hereinbelow.

Furthermore, the binder allows for fixing the coating layer of any one of the aspects of the present invention onto a substrate layer or onto the inner side of a food packaging, e.g., by a coating process. Thus, the binder is selected so that the coating layer does not delaminate, e.g., during storage, loading of the antimicrobial active composition and/or usage of the sheet-like element or food packaging.

According to a particularly preferred embodiment, the polymeric binder is selected from polyacrylic acid, salts thereof, derivatives thereof, starch, proteins, polyvinyl alcohol, styrene-butadiene latex, styrene-acrylate, polyvinyl acetate, polyolefines, ethylene acrylate, microfibrillated cellulose, microcrystalline cellulose, nanocellulose, cellulose, carboxymethylcellulose, bio-based latex, or mixtures thereof, and more preferably the polymeric binder is selected from the group consisting of polyacrylic acid, salts thereof, derivatives thereof, starch, proteins, styrene butadiene latex, polyvinyl alcohol, polyvinyl acetate and mixtures thereof, and most preferably the polymeric binder is polyacrylic acid or a salt or derivative thereof; and the polymeric binder is contained in the coating layer of any one of the aspects of the present invention in an amount from 5 to 30 parts by weight, preferably 5 to 20 parts by weight, and more preferably from 8 to 15 parts by weight.

The Antimicrobial Active Composition

Certain embodiments of the inventive sheet-like element and the inventive coating layer contain an antimicrobial active composition.

The antimicrobial active composition comprises at least one antimicrobial active ingredient preferably having a vapor pressure in the range from 1 to 500 Pa at 25° C. It is appreciated that the vapor pressure should not be too high in order to enable a sustained release of the antimicrobial active ingredient over the shelf life of the foodstuff. Thus, in a preferred embodiment of the present invention, the antimicrobial active composition comprises at least one antimicrobial active ingredient having a vapor pressure in the range from 1 to 400 Pa at 25° C., preferably from 1 to 300 Pa at 25° C., and most preferably from 1 to 250 Pa at 25° C.

At the same time, the vapor pressure of the antimicrobial active ingredient should preferably be sufficiently high to allow for an efficient vaporization. Thus, in a preferred embodiment of the present invention, the antimicrobial active composition comprises at least one antimicrobial active ingredient having a vapor pressure in the range from 10 to 500 Pa at 25° C., more preferably from 25 to 500 Pa at 25° C., and most preferably from 50 to 500 Pa at 25° C.

Consequently, the antimicrobial active composition preferably comprises at least one antimicrobial active ingredient having a vapor pressure in the range from 10 to 400 Pa at 25° C., more preferably from 25 to 300 Pa at 25° C., and most preferably from 50 to 250 Pa at 25° C.

In a preferred embodiment of the present invention, the antimicrobial active composition is of natural origin. In a particularly preferred embodiment of the present invention, the antimicrobial active composition comprises at least one essential oil (EO). The essential oil comprises at least one antimicrobial active ingredient as defined hereinabove. The essential oil may be a herbal extract and/or fruit extract. Essential oils are generally extracts of aromatic plants, plant parts, fruit or fruit parts, e.g., seeds, bark, stems, roots, flowers and other parts of plants. Suitable herbal extracts and/or fruit extracts can be used singly or in various mixtures. Typically, the essential oil is extracted from the plant and/or fruit by steam distillation. Other processes include expression, solvent extraction, sfumatura, absolute oil extraction, resin tapping, wax embedding, extraction by supercritical carbon dioxide and cold pressing.

Suitable essential oils include those generally recognized as safe under section 182.20 of the Code of Federal Regulations, and the essential oils described in H. Surburg and J. Panten, "Common Fragrance and Flavor Materials", 5th Ed., Wiley-VCH Weinheim 2006, pages 181 to 238.

In a preferred embodiment of the present invention, the essential oil (EO) is selected from the group consisting of alfalfa EO, allspice EO, bitter almond EO (free from prussic acid), ambrette (seed) EO, angelica root EO, angelica seed EO, angelica stem EO, angostura (cusparia bark) EO, anise EO, asafetida EO, balm (lemon balm) EO, balsam of peru, basil EO, bay leaves EO, bay (myrcia) EO, bergamot (bergamot orange) EO, bois de rose EO, cacao EO, camomile (chamomile) flowers EO, hungarian EO, roman or english EO, cananga EO, capsicum EO, caraway EO, cardamom seed (cardamon) EO, carob bean EO, carrot EO, cascarilla bark EO, cassia bark EO, cassia bark, padang or batavia EO, cassia bark Saigon EO, celery seed EO, cherry EO, chervil EO, chicory EO, cinnamon bark Ceylon EO, cinnamon bark Chinese EO, cinnamon bark Saigon EO, cinnamon leaf Ceylon EO, cinnamon leaf EO, cinnamon leaf Saigon EO, citronella EO, citrus peels EO, clary (clary sage) EO, clover EO, coca EO (decocainized), coffee EO, cola nut EO, coriander EO, cumin EO, curacao orange peel (orange, bitter peel) EO, cusparia bark EO, dandelion EO, dandelion root EO, dog grass (quackgrass, triticum) EO, elder flowers EO, estragole EO, estragon (tarragon) EO, fennel EO, fenugreek EO, galanga (galangal) EO, geranium EO, geranium, east Indian EO, geranium rose EO, ginger EO, grapefruit EO, guava EO, hickory bark EO, horehound (hoarhound) EO, hops EO, horsemint EO, hyssop EO, immortelle EO, jasmine EO, juniper (berries) EO, kola nut EO, laurel berries EO, laurel leaves EO, lavender EO, lavender spike EO, lavandin EO, lemon EO, lemon balm EO, lemon grass EO, lemon peel EO, lime EO, linden flowers EO, locust bean EO, lupulin EO, mace EO, mandarin EO, marjoram EO, mate EO, melissa EO, menthol EO, menthyl acetate EO, molasses (extract), mustard EO, naringin EO, neroli EO, bigarade EO, nutmeg EO, onion EO, orange EO, bitter orange flowers EO, bitter orange peel EO, orange leaf EO, sweet orange EO, sweet orange flowers EO, sweet orange peel EO, origanum EO, palmarosa EO, paprika EO, parsley EO, pepper, black EO, pepper, white EO, peppermint EO, peruvian balsam EO, petitgrain EO, petitgrain lemon EO, petitgrain, mandarin or tangerine EO, pimenta EO, pimenta leaf EO, pipsissewa leaves EO, pomegranate EO, prickly ash bark EO, rose absolute EO, rose EO, rose buds EO, rose flowers EO, rose fruit (hips) EO, rose geranium EO, rose leaves EO, rosemary EO, saffron EO, sage EO, sage, Greek EO, sage, Spanish EO, St. John's wort EO, summer savory EO, winter savory EO, schinus molle EO, sloe berries (blackthorn berries) EO, spearmint EO, spike lavender EO, tamarind EO, tangerine EO, tarragon EO, tea EO, thyme, white wild or creeping EO, triticum EO, tuberose EO, turmeric EO, vanilla EO, violet flowers EO, violet leaves EO, violet leaves absolute EO, wild cherry bark EO, ylang-ylang EO, zedoary bark EO, echinacea EO, goldenseal EO, calendula EO, kava kava EO, aloe EO, blood root EO, grapefruit seed extract EO, black cohosh EO, ginseng EO, guarana EO, cranberry EO, ginko biloba EO, evening primrose EO, yohimbe bark EO, green tea EO, ma huang EO, maca EO, bilberry EO, lutein EO, and ginger EO.

In a particularly preferred embodiment of the present invention, the essential oil (EO) is selected from the group consisting of cinnamon EO, thyme EO, clove EO, rosemary EO, oregano EO, orange EO, carrot seed EO, ginger EO, lemongrass EO, bay leaf EO, marjoram EO, mustard EO, Marigold EO, jasmine EO, patchouli EO, Gardenia EO, cedarwood EO, celery seed EO, mugwort EO, spikenard EO, orange bitter EO, palmarosa EO, allspice EO and mixtures thereof, and most preferably the essential oil (EO) is selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof.

Most preferably, the antimicrobial active composition consists only of at least one essential oil. In said embodiment, the antimicrobial active composition is an essential oil or a mixture of at least two essential oils.

In another embodiment of the present invention, the antimicrobial active composition comprises at least one antimicrobial active ingredient of natural or synthetic origin. Preferably, the antimicrobial active ingredient is derived from essential oils. The antimicrobial active ingredient may be a flavor or fragrance material. Flavor or fragrance materials can be divided into several sub-groups, i.e., aliphatic compounds, acyclic terpenes, cyclic terpenes, other cycloaliphatic compounds, aromatic compounds, phenols and phenol derivatives, O-, O,S- and S,S-heterocycles, and N- and N,S-heterocycles. Suitable compounds are those described in H. Surburg and J. Panten, "Common Fragrance and Flavor Materials", 5th Ed., Wiley-VCH Weinheim 2006, pages 7 to 176.

In a preferred embodiment of the present invention, the antimicrobial active ingredient is selected from the group comprising thymol, cinnamal, geraniol, carvacrol, citral, citronellol, eucalyptol, β-pinene, cinnamaldehyde, glucosinolates (e.g., sinigrin, glucotropaeolin, gluconasturtiin, glucoraphanin or progoitrin), patchoulol, α-pinene, fenchene, camphene, carene, myrcene, α-phellandrene, α-terpinene, 1,8-cineol, γ-terpinene, p-cymene, terpinolene, 1-octen-3-ol, α-cubenene, camphor, linalool, bornyl acetate, fenchole, caryophyllene, terpinen-4-ol, E-pinocarveol, α-humulene, isoborneol, γ-muurolene, α-terpineol, borneol, cadinene, p-cymen-8-ol, eugenol, eugenol methyl ether, eugenol acetate, thymol acetate, linalyl acetate, 2-heptanone, 2-heptyl acetate, β-ocimene, 2-nonanone, methyl salicylate, p-allyl phenol, α-thujene, β-myrcene, o-cymene, and mixtures thereof.

In other words, it is possible to provide at least one essential oil or a composition comprising at least one essential oil as the antimicrobial active composition. However, it is also possible to provide an antimicrobial active composition, which is not an essential oil, but comprises at least one antimicrobial active ingredient being a single chemical compound.

The antimicrobial active composition may comprise further compounds, such as at least one viscosity modifier. The viscosity of the antimicrobial active composition may be suitably adapted to enhance retention of the antimicrobial active composition in the coating layer and/or to enable inkjet printing of the antimicrobial active composition onto the coating layer. Alternatively, the viscosity of the antimicrobial active composition may be suitably adapted to facilitate spraying and/or coating of the antimicrobial active composition.

In one embodiment of the present invention, the viscosity modifier is selected from the group comprising starch, modified starch, maltodextrin, dextran, vegetable gums, pectin, proteins (e.g., collagen, egg white, gelatin, casein, albumin), arrowroot, cornstarch, kuzu starch, katakuri starch, potato starch, sago, wheat flour, almond flour, tapioca, konyak, aiyu jelly, alginines (e.g., alginic acid, sodium alginate, potassium alginate, ammonium alginate, calcium alginate and propylene glycol alginate), guar gum, locust bean gum, oat gum, xanthan gum, acacia gum, karaya gum, tara gum, gellan gum, gum ghatti, agar, gum Arabic, baker's yeast glycan, arabinogalactan, tragacanth, cellulose, cellulose derivatives (e.g., carboxymethyl cellulose, sodium carboxymethyl cellulose, ethyl cellulose, methyl cellulose, hydroxypropylmethyl cellulose, hydroxymethyl cellulose, hydroxypropyl cellulose, ethyl methyl cellulose, microcrystalline cellulose, ethyl hydroxyethyl cellulose, croscarmellose), pectin, carrageenan, processed eucheuma seaweed, curdlan, konjac gum, cassia gum, fumed silica, polyacrylic acid, glycated gelatin gels, and/or salts thereof and mixtures thereof. Preferably, the viscosity modifier is a compound, which is approved for use in a foodstuff by the Scientific Committee on Food and/or the European Food Safety Authority.

In a preferred embodiment of the present invention, the viscosity modifier is selected from the group consisting of guar gum, starch, cellulose, carboxymethyl cellulose, locust bean gum, xanthan gum, pectin, carrageenan, agar, salts thereof, derivatives thereof and mixtures thereof.

In one embodiment of the present invention, the antimicrobial active composition comprises at least one antimicrobial active ingredient and at least one viscosity modifier. In another embodiment of the present invention, the antimicrobial active composition comprises, preferably consists of, at least one essential oil and at least one viscosity modifier.

In one embodiment of the present invention, the antimicrobial active composition further comprises a fragrance and/or a flavour in addition to the antimicrobial active ingredient. Fragrances and/or flavors are preferably alcohols, aldehydes and/or ketones having a molecular weight of at least about 100 g/mol and which are useful in imparting an odour, fragrance, essence, flavor, or scent either alone or in combination with other fragrances and/or flavors. For example, the fragrance and/or flavor can be selected from the group comprising 2,4-dimethyl-3-cyclohexene-1-methanol (floralol), 2,4-dimethyl cyclohexane methanol (dihydro floralol), 5,6-dimethyl-1-methylethenylbicyclo[2.2.1]hept-5-ene-2-methanol (arbozol), α,α,-4-trimethyl-3-cyclohexen-1-methanol (α-terpineol), 2,4,6-trimethyl-3-cyclohexene-1-methanol (isocyclo geraniol), 4-(1-methylethyl) cyclohexane methanol (mayol), α-3,3-trimethyl-2-norborane methanol, 1,1-dimethyl-1-(4-methylcyclohex-3-enyl)methanol, 2-phenylethanol, 2-cyclohexyl ethanol, 2-(o-methylphenyl)-ethanol, 2-(m-methylphenyl)ethanol, 2-(p-methylphenyl)ethanol, 6,6-dimethylbicyclo-[3.1.1]hept-2-ene-2-ethanol (nopol), 2-(4-methylphenoxy)-ethanol, 3,3-dimethyl-Δ2-β-norbornane ethanol (patchomint), 2-methyl-2-cyclohexylethanol, 1-(4-isopropylcyclohexyl)-ethanol, 1-phenylethanol, 1,1-dimethyl-2-phenylethanol, 1,1-dimethyl-2-(4-methyl-phenyl)ethanol, 1-phenylpropanol, 3-phenylpropanol, 2-phenylpropanol (Hydrotropic Alcohol), 2-(cyclododecyl)propan-1-ol (hydroxy-ambran), 2,2-dimethyl-3-(3-methylphenyl)-propan-1-ol (majantol), 2-methyl-3-phenylpropanol, 3-phenyl-2-propen-1-ol (cinnamyl alcohol), 2-methyl-3-phenyl-2-propen-1-ol (methylcinnamyl alcohol), α-n-pentyl-3-phenyl-2-propen-1-ol (α-amyl-cinnamyl alcohol), ethyl-3-hydroxy-3-phenyl propionate, 2-(4-methylphenyl)-2-propanol, 3-(4-methylcyclohex-3-ene)butanol, 2-methyl-4-(2,2,3-trimethyl-3-cyclopenten-1-yl)butanol, 2-ethyl-4-(2,2,3-trimethyl-cyclopent-3-enyl)-2-buten-1-ol, 3-methyl-2-buten-1-ol (prenol), 2-methyl-4-(2,2,3-trimethyl-3-cyclopenten-1-yl)-2-buten-1-ol, ethyl 3-hydroxybutyrate, 4-phenyl-3-buten-2-ol, 2-methyl-4-phenylbutan-2-ol, 4-(4-hydroxyphenyl)butan-2-one, 4-(4-hydroxy-3-methoxyphenyl)-butan-2-one, 3-methyl-pentanol, 3-methyl-3-penten-1-ol, 1-(2-propenyl) cyclopentan-1-ol (plinol), 2-methyl-4-phenylpentanol (pamplefleur), 3-methyl-5-phenylpentanol (phenoxanol), 2-methyl-5-phenylpentanol, 2-methyl-5-(2,3-dimethyltricyclo[2.2.1.0.sup.(2,6)]hept-3-yl)-2-penten-1-ol (santalol), 4-methyl-1-phenyl-2-pentanol, 5-(2,2,3-trimethyl-3-cyclopentenyl)-3-methylpentan-2-ol (sandalore), (1-methyl-bicyclo[2.1.1]hepten-2-yl)-2-methylpent-1-en-3-ol, 3-methyl-1-phenylpentan-3-ol, 1,2-dimethyl-3-(1-methylethenyl) cyclopentan-1-ol, 2-isopropyl-5-methyl-2-hexenol, cis-3-hexen-1-ol, trans-2-hexen-1-ol, 2-isoproenyl-4-methyl-4-hexen-1-ol (lavandulol), 2-ethyl-2-prenyl-3-hexenol, 1-hydroxymethyl-4-iso-propenyl-1-cyclohexene (dihydrocuminyl alcohol), 1-methyl-4-isopropenylcyclohex-6-en-2-ol (carvenol), 6-methyl-3-isopropenylcyclohexan-1-ol (dihydrocarveol), 1-methyl-4-iso-propenylcyclohexan-3-ol, 4-isopropyl-1-methylcyclohexan-3-ol, 4-tert-butylcyclohexanol, 2-tert-butylcyclohexanol, 2-tert-butyl-4-methylcyclohexanol (rootanol), 4-isopropyl-cyclohexanol, 4-methyl-1-(1-methylethyl)-3-cyclohexen-1-ol, 2-(5,6,6-trimethyl-2-norbornyl)cyclohexanol, isobornylcyclohexanol, 3,3,5-trimethylcyclohexanol, 1-methyl-4-isopropylcyclohexan-3-ol, 1-methyl-4-isopropylcyclohexan-8-ol (dihydroterpineol), 1,2-dimethyl-3-(1-methylethyl)cyclohexan-1-ol, heptanol, 2,4-dimethylheptan-1-ol, 6-heptyl-5-hepten-2-ol (isolinalool), 2,4-dimethyl-2,6-heptandienol, 6,6-dimethyl-2-oxymethyl-bicyclo[3.1.1]hept-2-ene (myrtenol), 4-methyl-2,4-heptadien-1-ol, 3,4,5,6,6-pentamethyl-2-heptanol, 3,6-dimethyl-3-vinyl-5-hepten-2-ol, 6,6-dimethyl-3-hydroxy-2-methylenebicyclo[3.1.1]heptane, 1,7,7-trimethylbicyclo[2.2.1]heptan-2-ol, 2,6-dimethylheptan-2-ol (dimetol), 2,6,6-trimethylbicyclo[1.3.3]heptan-2-ol, octanol, 2-octenol, 2-methyloctan-2-ol, 2-methyl-6-methylene-7-octen-2-ol (myrcenol), 7-methyloctan-1-ol, 3,7-dimethyl-6-octenol, 3,7-dimethyl-7-octenol, 3,7-dimethyl-6-octen-1-ol (citronellol), 3,7-dimethyl-2,6-octadien-1-ol (geraniol), 3,7-dimethyl-2,6-octadien-1-ol (nerol), 3,7-dimethyl-7-methoxyoctan-2-ol (osyrol), 3,7-dimethyl-1,6-octadien-3-ol (linalool), 3,7-dimethyloctan-1-ol (pelargol), 3,7-dimethyloctan-3-ol (tetrahydrolinalool), 2,4-octadien-1-ol, 3,7-dimethyl-6-octen-3-ol (dihydrolinalool), 2,6-dimethyl-7-octen-2-ol (dihydromyrcenol), 2,6-dimethyl-5,7-octadien-2-ol, 4,7-dimethyl-4-vinyl-6-octen-3-ol, 3-methyloctan-3-ol, 2,6-dimethyloctan-2-ol, 2,6-dimethyloctan-3-ol, 3,6-dimethyloctan-3-ol, 2,6-dimethyl-7-octen-2-ol, 2,6-dimethyl-3,5-octadien-2-ol (muguol), 3-methyl-1-octen-3-ol, 7-hydroxy-3,7-dimethyloctanal, 3-nonanol, 2,6-nonadien-1-ol, cis-6-nonen-1-ol, 6,8-dimethylnonan-2-ol, 3-(hydroxymethyl)-2-nonanone, 2-nonen-1-ol, 2,4-nonadien-1-ol, 3,7-dimethyl-1,6-nonadien-3-ol, decanol, 9-decenol, 2-benzyl-M-dioxa-5-ol, 2-decen-1-ol, 2,4-decadien-1-ol, 4-methyl-3-decen-5-ol, 3,7,9-trimethyl-1,6-decadien-3-ol (isobutyl linalool), undecanol, 2-undecen-1-ol, 10-undecen-1-ol, 2-dodecen-1-ol, 2,4-dodecadien-1-ol, 2,7,11-trimethyl-2,6,10-dodecatrien-1-ol (farnesol), 3,7,11-trimethyl-1,6,10,-dodecatrien-3-ol (nerolidol), 3,7,11,15-tetramethylhexadec-2-en-1-ol (phytol), 3,7,11,15-tetramethylhexadec-1-en-3-ol (iso phytol), benzyl alcohol, p-methoxy benzyl alcohol (anisyl alcohol), para-cymen-7-ol (cuminyl alcohol), 4-methyl benzyl alcohol, 3,4-methylenedioxy benzyl alcohol, methyl salicylate, benzyl salicylate, cis-3-hexenyl salicylate, n-pentyl salicylate, 2-phenylethyl salicylate, n-hexyl salicylate, 2-methyl-5-isopropylphenol, 4-ethyl-2-methoxyphenol, 4-allyl-2-methoxyphenol (eugenol), 2-methoxy-4-(1-propenyl)phenol (isoeugenol), 4-allyl-2,6-dimethoxy-phenol, 4-tert-butylphenol, 2-ethoxy-4-methylphenol, 2-methyl-4-vinylphenol, 2-isopropyl-5-methylphenol (thymol), pentyl-ortho-hydroxy benzoate, ethyl 2-hydroxy-benzoate, methyl 2,4-dihydroxy-3,6-dimethylbenzoate, 3-hydroxy-5-methoxy-1-methylbenzene, 2-tert-butyl-4-methyl-1-hydroxybenzene, 1-ethoxy-2-hydroxy-4-propenylbenzene, 4-hydroxytoluene, 4-hydroxy-3-methoxybenzaldehyde, 2-ethoxy-4-hydroxybenzaldehyde, decahydro-2-naphthol, 2,5,5-trimethyl-octahydro-2-naphthol, 1,3,3-trimethyl-2-norbornanol (fenchol), 3a,4,5,6,7,7a-hexahydro-2,4-dimethyl-4,7-methano-1H-inden-5-ol, 3a,4,5,6,7,7a-hexahydro-3,4-dimethyl-4,7-methano-1H-inden-5-ol, 2-methyl-2-vinyl-5-(1-hydroxy-1-methylethyl)tetrahydrofuran, β-caryophyllene alcohol, vanillin, ethyl vanillin, cinnamaldehyde, benzaldehyde, phenyl acetaldehyde, heptylaldehyde, octylaldehyde, decylaldehyde, undecylaldehyde, undecylenic aldehyde, dodecylaldehyde, tridecylaldehyde, methylnonyl aldehyde, didecylaldehyde, anisaldehyde, citronellal, citronellyloxyaldehyde, cyclamen aldehyde, α-hexyl cinnamaldehyde, hydroxycitronellal, α-methyl cinnamaldehyde, methylnonyl acetaldehyde, propylphenyl aldehyde, citral, perilla aldehyde, tolylaldehyde, tolylacetaldehyde, cuminaldehyde, LILIAL®, salicyl aldehyde, α-amylcinnamaldehyde and heliotropin and mixtures thereof.

The antimicrobial active composition, when added to the coating layer of any one of the aspects of the present invention, which is then positioned within a food packaging, releases the antimicrobial active ingredient into the atmosphere of the food packaging steadily over an extended period of time by evaporation. Furthermore, the antimicrobial active composition remains stable on the coating layer of any one of the aspects of the present invention. Thus, the inventive sheet-like element and/or the inventive coating layer prevents or retards the growth of pathogenic microorganisms within the foodstuff and the food packaging, thus extending the shelf life of the foodstuff.

The Substrate Layer

The inventive sheet-like element contains a substrate layer.

It is a requirement that the coating layer can be fixed onto the substrate layer, e.g., by an application step as described hereinbelow, and that the coating layer does not delaminate, e.g., during storage, loading of the antimicrobial active composition and/or usage of the sheet-like element. The skilled person knows how to compatibilize a given substrate layer and the inventive coating layer, e.g., by selecting an appropriate polymeric binder as described hereinabove and/or by providing a primer layer as described hereinbelow. Therefore, the present invention is not limited to any particular substrate layer.

The substrate layer comprises one or more individual substrate layers, i.e., the substrate layer may have a monolayer or a multilayer structure. If the substrate layer comprises two or more individual substrate layers, the individual substrate layers may be made from the same or different material. There are no limitations to the thickness of the substrate layer and/or the individual substrate layers. For example, the substrate layer may have a thickness ranging from 1 μm to 10 mm, preferably from 10 μm to 1 mm and more preferably from 20 μm to 0.5 mm, for example from 50 to 150 μm. For example, the individual substrate layers may have a thickness ranging from 1 μm to 10 mm, preferably from 10 μm to 1 mm and more preferably from 20 μm to 0.5 mm, for example from 50 to 150 μm.

In a preferred embodiment of the present invention, the one or more individual substrate layers selected are selected from the group consisting of polymer material layers. Suitable polymer materials are those listed in part 177, 21 Code of Federal Regulations (CFR).

Preferably, the polymer material layer is made from polyethylene, polypropylene, polyethylene terephthalate, polylactic acid, polyhydroxybutyrate, polyethylene-2,5-furandicarboxylate or polystyrene, fibrous material layers, more preferably made from viscose, cellulose acetate, polypropylene or polyethylene terephthalate, paper layers, cardboard layers, textile layers, nonwoven layers, layers made from bio-based materials, wood layers, bamboo layers, metal foil layers, aluminum layers, print receptive coating layers, and mixtures of the foregoing. The one or more individual substrate layers optionally have been subjected to a corona treatment.

In a particularly preferred embodiment of the present invention, the one or more individual substrate layer is a polymer material layer. The polymer material layer may be provided in the form of a sheet or a film. The polymer material layer may be made from any polymeric material of natural or synthetic origin, and preferably is made from polyethylene (e.g., linear low density polyethylene, low density polyethylene or high density polyethylene), polypropylene, polycarbonate, polyvinylidene dichloride, polymethyl methacrylate, biaxially oriented polypropylene, copolymers of ethylene and propylene, polystyrene, polyester (e.g., polyethylene terephthalate, copolymers of ethylene terephthalate and ethylene isophthalate, polyethylene naphthalate, polylactic acid, polyhydroxybutyrate, polyethylene-2,5-furandicarboxylate), biaxially oriented polyesters (e.g., biaxially oriented polyethylene terephthalate), polyvinyl chloride, cellulose acetate, cellophane, or mixtures thereof, and more preferably, the polymer material layer is made from polyethylene, polypropylene, polyethylene terephthalate, polylactic acid, polyhydroxybutyrate, polyethylene-2,5-furandicarboxylate, polystyrene or mixtures thereof.

The polymer material layer may be produced by any method known to the skilled person, e.g., by an extrusion process, a coextrusion process, a casting process, a calendering process, a solution deposition process, or a skiving process. A substrate layer comprising two or more individual polymer material layers may be produced by a lamination process or an extrusion coating process. A substrate layer comprising at least one individual polymer material layer and at least one different individual substrate layer may be produced by a coating process or a lamination process, or, if the at least one different individual substrate layer is made from metal, by a vapor deposition process.

In another embodiment of the present invention, the one or more individual substrate layer is a fibrous material layer. The fibrous material layer may be a fabric layer, a textile layer or a cloth layer, which is formed from a filament, a yarn, a thread, or a staple fiber, e.g., by weaving, knitting, braiding, crocheting, knotting or felting. For example, the individual substrate layer may be a nonwoven layer. The production of a nonwoven fabric involves a web formation step, such as drylaying, airlaying, wetlaying, spunlaying, meltblown and submicron spinning, and a web bonding step, such as calendering, air through bonding, needle punching, hydroentanglement, stitchbonding and chemical bonding, and optionally a finishing treatment, such as embossing, stretching, perforating, crimping, or coating.

The fibrous material layer may be made from any polymeric material of natural or synthetic origin, e.g., wool, flax, cotton, hemp, sisal, mineral fibers, viscose, cellulose acetate, polyethylene, polyacrylonitrile, polypropylene, polyesters, polyethylene terephthalate, polylactic acid or mixtures thereof, and preferably the fibrous material layer is made from viscose, cellulose acetate, polypropylene, polyethylene terephthalate, polylactic acid or mixtures thereof.

In still another embodiment of the present invention, the one or more individual substrate layer is a paper layer or a cardboard layer. The paper layer or cardboard layer comprises cellulose fibers, e.g., formed from wood pulp, and may further comprise additives, e.g., those listed under part 176, 21 Code of Federal Regulations (CFR).

In yet another embodiment, the one or more individual substrate layer is a layer made from bio-based materials. For the purposes of the present invention, the term "bio-based"

material is defined in accordance with European Standard EN 16575:2014 and relates to a material derived from biomass, i.e., a material of biological origin excluding material embedded in geological formations and/or fossilized material. In the manufacture of the biobased material, the biomass may have undergone physical, chemical or biological treatments. Thus, suitable layers include wood layers, bamboo layers, paper layers, cardboard layers, as well as layers made from biopolymers, such as polylactic acid, polybutylene succinate or polyhydroxybutyate.

In still another embodiment of the present invention, the one or more individual substrate layer is a metal foil layer, e.g., a tin layer or an aluminum layer. The metal foil layer may be formed by hammering or rolling, or may be deposited onto a different individual substrate layer by metal vapor deposition.

In one embodiment of the present invention, the one or more individual substrate layer is a print receptive coating layer. The print receptive coating may comprise an inorganic pigment, such as calcium carbonate or kaolin, and comprises a binder, e.g., a polymeric binder as described hereinabove. Optionally, the print receptive coating layer may comprise a cationic dye fixing agent, e.g., a water-soluble metal salt, preferably sodium chloride, aluminum sulfate, calcium chloride or magnesium chloride, or polydimethyldiallylammonium chloride. Thus, the sheet-like element can be printed with a pattern, a logo, a text, or other information, e.g., by offset printing or inkjet printing. Preferably, the ink receptive coating layer is positioned on the sheet-like element on the opposite side of the coating layer.

The substrate layer can be coated evenly with the inventive coating layer. Thus, an optimal adhesion of the coating layer to the substrate layer can be achieved regardless of the material of the food packaging. The so-obtained sheet-like element can be loaded with the antimicrobial active ingredient and e.g. loosely placed into the food packaging. Furthermore, the substrate layer allows for "added functionality" of the sheet-like element, such as hosting additional printed information, hosting an adhesive layer for reversible or irreversible fixing of the sheet-like element within the food packaging, or hosting a spoilage indicator label.

The Sheet-Like Element

According to a first aspect of the present invention, a sheet-like element suitable for use in a food packaging is provided. The sheet-like element comprises a coating layer and a substrate layer.

The coating layer comprises 100 parts by weight of a particulate filler comprising a surface-reacted calcium carbonate in an amount of at least 50 wt.-%, based on the total amount of the particulate filler, 0.1 to 10 parts by weight of a dispersant, and 5 to 30 parts by weight of a polymeric binder. It is appreciated that the particulate filler, the surface-reacted calcium carbonate, the dispersant and the polymeric binder are described hereinabove.

The coating layer may comprise the inventive particulate filler in an amount of at least 60 wt.-%, preferably at least 70 wt.-% and more preferably of at least 75 wt.-%, based on the total dry weight of the coating layer, while the coating layer also comprises a binder and a dispersant in accordance with the present invention. The minimum amount of binder preferably is 1.9 wt.-%, based on the total dry weight of the coating layer. The minimum amount of dispersant preferably is 0.1 wt.-%, based on the total dry weight of the coating layer.

The coating layer may comprise the particulate filler in an amount from 60 to 98 wt.-%, preferably from 70 to 95 wt.-% and more preferably from 75 to 92 wt.-%, based on the total dry weight of the coating layer. Additionally or alternatively, the coating layer may comprise the dispersant in an amount from 0.1 to 10 wt.-%, preferably from 0.5 to 7 wt.-% and more preferably from 1.0 to 4 wt.-%, or, alternatively, from 1.0 to 10 wt.-%, based on the total dry weight of the coating layer. Additionally or alternatively, the coating layer may comprise the binder in an amount of from 1.9 wt.-% to 30 wt.-%, preferably from 4.5 wt.-% to 23 wt.-%, more preferably from 7.0 to 21 wt.-%, based on the total dry weight of the coating layer.

Furthermore, the coating layer may contain further additives, such as a rheology modifier, a viscosity enhancer, a wetting agent, a wax, an antistatic agent, and/or an antifoaming agent. Suitable viscosity modifiers include thickening agents, such as the thickening agents described hereinabove. The coating layer may comprise up to 5 parts by weight, preferably up to 3 parts by weight of the further additive. According to one embodiment, the coating layer further comprises the further additive in an amount of from 0.05 to 4.2 wt. %, preferably from 0.1 to 2.0 wt. %, more preferably from 0.2 to 1.0 wt. %, based on the total dry weight of the coating layer.

Thus, in one embodiment of the present invention, the coating layer comprises the particulate filler in an amount from 60 to 98 wt.-%, the dispersant in an amount from 0.1 to 10 wt.-%, the binder in an amount from 1.9 to 30 wt.-%, and optionally further additives in an amount of 0 to 4.2 wt.-%, each based on the total dry weight of the coating layer.

It is appreciated that the amount of the particulate filler, the binder, the dispersant and the optional further additives add up to 100 wt.-%, based on the total dry weight of the coating layer. Thus, in one embodiment, the coating layer does not comprise further additives, and the amount of the particulate filler, the binder and the dispersant add up to 100 wt.-%, based on the total dry weight of the coating layer.

The coating layer is adapted for the uptake of an antimicrobial active composition as defined hereinabove. Therefore, it is preferred that the coating layer has a high porosity in order to host sufficiently high amounts of the antimicrobial active composition. For the purposes of the present invention, the porosity of the coating layer is represented by the total intruded specific pore volume of the coating layer, as measured by mercury intrusion porosimetry.

Thus, the coating layer of the present invention has a total intruded specific pore volume in the range from 0.25 to 2 cm3/g, as measured by mercury intrusion porosimetry. In a preferred embodiment, the total intruded specific pore volume is in the range from 0.4 to 1.5 cm3/g, and more preferably from 0.5 to 1.0 cm3/g, as measured by mercury intrusion porosimetry.

In a preferred embodiment, the coating layer has

- a total intra particle intruded specific pore volume in the range from 0.05 to 1.0 $cm^3/g$, preferably from 0.08 to 0.5 $cm^3/g$, and more preferably from 0.1 to 0.4 $cm^3/g$, as measured by mercury intrusion porosimetry,
- a total inter particle intruded specific pore volume in the range from 0.05 to 0.5 $cm^3/g$, preferably from 0.08 to 0.4 $cm^3/g$, and more preferably from 0.1 to 0.3 $cm^3/g$, as measured by mercury intrusion porosimetry, and/or
- a total occlusion intruded specific pore volume in the range from 0.05 to 0.4 $cm^3/g$, preferably from 0.08 to 0.3 $cm^3/g$, and more preferably from 0.1 to 0.2 $cm^3/g$, as measured by mercury intrusion porosimetry.

The total intruded specific pore volume, the total inter particle intruded specific pore volume and the total occlusion intruded specific pore volume is determined as described in C. J. Ridgway, P. A. C. Gane, "On bulk density measurement and coating porosity calculation for coated paper samples", Nordic Pulp and Paper Research Journal 2003, 18, 24-31. In brief, a sample is coated onto an impermeable substrate, such as aluminum foil, and characterized using a Micromeritics Autopore V mercury porosimeter in an equivalent Laplace diameter range from 208 μm to 0.004 μm. The specific pore volume is given relative to the weight of the coating layer excluding the impermeable substrate.

The total pore volume seen in the cumulative intrusion data can be separated into two regions with the intrusion data from 214 μm down to about 10 μm showing the scrolling method and the interface between the coating and the foil resulting in some initial pore volume contribution over the large pore diameter range. Below these diameters lies the fine interparticle pore volume of the coating. If these particles also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the coated sample.

By taking the first derivative of the cumulative intrusion curve, the pore size distributions based on equivalent Laplace diameter, inevitably including pore-shielding, are revealed. The differential curves clearly show the occlusion pore structure region, the interparticle pore region and the intraparticle pore region, if present. Knowing the intraparticle pore diameter range, it is possible to subtract the remainder interparticle and occlusion pore volume from the total pore volume to deliver the desired pore volume of the internal pores alone in terms of the pore volume per unit mass (specific pore volume). The same principle of subtraction, of course, applies for isolating any of the other pore size regions of interest.

The coating layer of the present invention has a high fluid receptivity. In a preferred embodiment, the coating layer has a fluid receptivity in the range from 1 to 50 wt.-%, more preferably from 10 to 45 wt.-%, and most preferably from 15 to 35 wt.-%. Thus, the coating layer may be loaded with high amounts of the antimicrobial active composition without delamination of the coating layer and without leakage of the antimicrobial active composition.

The particulate filler comprising the surface-reacted calcium carbonate is present in the coating layer in order to provide the high porosity of the coating layer. It is believed that the intra particle pores, inter particle pores and coarse agglomerate pores of the particulate filler, and especially the surface-reacted calcium carbonate are essentially retained in the coating layer, thus allowing for a high uptake of the antimicrobial active ingredient.

The dispersant is added to the coating formulation used to form the coating layer in order to disperse the particulate filler evenly throughout the coating layer. In this way, the number of agglomerates of the particulate filler is reduced. Thus, the pores of the surface-reacted calcium carbonate remain accessible for the antimicrobial active composition to a large extent. In a preferred embodiment, the coating layer comprises the dispersant in an amount from 1 to 5 parts by weight, more preferably from 1.5 to 3 parts by weight. Alternatively, the coating layer comprises the dispersant in an amount from 1.5 to 10 parts by weight. The coating layer may comprise the dispersant in an amount from 0.5 to 7 wt.-% and more preferably from 1.0 to 4 wt.-%, or, alternatively, from 1.0 to 10 wt.-%, based on the total dry weight of the coating layer.

The polymeric binder is added in order to obtain a coating layer that can be evenly distributed on the substrate layer and adheres to the substrate layer. The amount of polymeric binder, which is added, is chosen high enough to allow for sufficient cohesion and adhesion of the layer, but low enough not to block or clog the pores of the surface-reacted calcium carbonate. In a preferred embodiment, the coating layer comprises the polymeric binder in an amount of from 5 to 20 parts by weight, more preferably from 8 to 15 parts by weight. The coating layer may comprise the binder in an amount from 4.5 wt.-% to 23 wt.-%, more preferably from 7 to 21 wt.-%, based on the total dry weight of the coating layer.

The coating layer is deposited on a substrate layer, wherein the substrate layer is as described hereinabove. The present invention is not limited to any particular substrate layers. The skilled person will adjust the composition of the coating layer to allow for an efficient adhesion of the coating layer to the selected substrate layer. Depending on the substrate layer used, the sheet-like element may be flexible, i.e., it can be bent without delamination of the coating layer, or rigid. The substrate layer allows for obtaining an evenly distributed coating layer. Thus, an optimal adhesion of the coating layer to the substrate layer can be achieved regardless of the material of the food packaging. Furthermore, the substrate layer allows for "added functionality" of the sheet-like element.

Preferably, the coating layer is present on the substrate layer in an amount from 1 to 70 g/m2, preferably from 2 to 50 g/m2, more preferably from 10 to 50 g/m2 and most preferably from 25 to 50 g/m2. The coating layer may be applied to the substrate layer by a process as described hereinbelow, preferably by a roller coating step.

In one embodiment, the sheet-like element suitable for use in a food packaging comprises a) a coating layer comprising
  a.1) 100 parts by weight of a particulate filler comprising a surface-reacted calcium carbonate in an amount of at least 50 wt.-%, based on the total amount of the particulate filler,
  wherein the surface-reacted calcium carbonate is a reaction product of natural ground calcium carbonate or precipitated calcium carbonate with carbon dioxide and one or more $H_3O$+ ion donors, wherein the carbon dioxide is formed in situ by the $H_3O$+ ion donors treatment and/or is supplied from an external source, and
  wherein the surface-reacted calcium carbonate has a specific surface area in the range from 20 to 200 $m^2/g$, as measured by the BET method,
  a.2) 1.5 to 10 parts by weight of a dispersant,
  a.3) 5 to 30 parts by weight of a polymeric binder; and
b) a substrate layer, wherein the coating layer has a total intruded specific pore volume in the range from 0.25 to 2 $cm^3/g$, as measured by mercury intrusion porosimetry.

In another preferred embodiment, the sheet-like element comprises a coating layer comprising 100 parts by weight of a particulate filler comprising a surface-reacted calcium carbonate having a specific surface area in the range from 20 to 200 m2/g, as measured by the BET method, in an amount of at least 70 wt.-%, based on the total amount of the particulate filler, 0.1 to 10 parts of a dispersant being a polyacrylic acid having a molecular weight in the range of 1000 to 15000 g/mol or a salt or derivative thereof, and 5 to 30 parts of a polymeric binder preferably being a polyacrylic acid or a salt or derivative thereof.

In still another preferred embodiment, the sheet-like element comprises a coating layer comprising 100 parts by weight of a particulate filler comprising a surface-reacted calcium carbonate having a specific surface area in the range from 20 to 200 m2/g, as measured by the BET method, in an amount of at least 90 wt.-%, based on the total amount of the particulate filler, 0.1 to 10 parts of a dispersant being a polyacrylic acid having a molecular weight in the range of 1000 to 15000 g/mol or a salt or derivative thereof, and 5 to 30 parts of a polymeric binder preferably being a polyacrylic acid or a salt or derivative thereof, and a substrate layer comprising one or more individual substrate layers being polymer material layers.

In yet another preferred embodiment, the sheet-like element comprises a coating layer comprising 100 parts by weight of a particulate filler comprising a surface-reacted calcium carbonate having a specific surface area in the range from 20 to 200 m2/g, as measured by the BET method, in an amount of at least 70 wt.-%, based on the total amount of the particulate filler, 1.5 to 10 parts of a dispersant being a polyacrylic acid having a molecular weight in the range of 1000 to 15000 g/mol or a salt or derivative thereof, and 5 to 30 parts of a polymeric binder preferably being a polyacrylic acid or a salt or derivative thereof.

In still another preferred embodiment, the sheet-like element comprises a coating layer comprising 100 parts by weight of a particulate filler comprising a surface-reacted calcium carbonate having a specific surface area in the range from 20 to 200 m2/g, as measured by the BET method, in an amount of at least 90 wt.-%, based on the total amount of the particulate filler, 1.5 to 10 parts of a dispersant being a polyacrylic acid having a molecular weight in the range of 1000 to 15000 g/mol or a salt or derivative thereof, and 5 to 30 parts of a polymeric binder preferably being a polyacrylic acid or a salt or derivative thereof, and a substrate layer comprising one or more individual substrate layers being polymer material layers.

In a particularly preferred embodiment, the sheet-like element further comprises an antimicrobial active composition as defined hereinabove. The antimicrobial active composition may be applied onto the coating layer, e.g., by dripping, spraying, coating, inkjet printing or dip coating to yield a loaded coating layer. If the sheet-like element comprising the loaded coating layer is placed into a food packaging, the antimicrobial active ingredient contained in the antimicrobial active composition evaporates over an extended time period so that the atmosphere in the food packaging contains the vapor of the antimicrobial active ingredient. Thus, the shelf life of the foodstuff is extended.

In a preferred embodiment of the present invention, the sheet-like element comprises the antimicrobial active composition in an amount from 1 to 50 wt.-%, based on the total weight of the coating layer, preferably in an amount from 5 to 45 wt. %, and most preferably in an amount from 10 to 45 wt.-%, such as from 15 to 35 wt.-%. In a particularly preferred embodiment of the present invention, the sheet-like element comprises an antimicrobial active composition in an amount from 1 to 50 wt.-%, based on the total weight of the coating layer, preferably in an amount from 5 to 45 wt.-%, and most preferably in an amount from 10 to 45 wt.-%, such as from 15 to 35 wt.-%, wherein the antimicrobial active composition consists of at least one essential oil and optionally at least one viscosity modifier.

It is appreciated that the amount of the particulate filler, the binder, the dispersant, the optional further additives and the antimicrobial active composition preferably add up to 100 wt.-%, based on the total weight of the coating layer. Thus, in one embodiment, the coating layer does not comprise further additives, and the amount of the particulate filler, the binder, the dispersant and the antimicrobial active composition add up to 100 wt.-%, based on the total weight of the coating layer.

Thus, in an exemplary embodiment of the present invention, the sheet-like element comprises a coating layer comprising 100 parts by weight of a particulate filler comprising a surface-reacted calcium carbonate having a specific surface area in the range from 20 to 200 m2/g, as measured by the BET method, in an amount of at least 50 wt.-%, based on the total amount of the particulate filler, 0.1 to 10 parts of a dispersant being a polyacrylic acid having a molecular weight in the range of 2000 to 15000 g/mol or a salt or derivative thereof, and 5 to 30 parts of a polymeric binder preferably being a polyacrylic acid or a salt or derivative thereof, optionally a substrate layer comprising one or more individual substrate layers being polymer material layers, and an antimicrobial active composition in an amount from 1 to 50 wt.-%, based on the weight of the coating layer, wherein the antimicrobial active composition comprises, preferably consists of at least one essential oil selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof, and optionally at least one viscosity modifier.

Thus, in another exemplary embodiment of the present invention, the sheet-like element comprises a coating layer comprising 100 parts by weight of a particulate filler consisting of a surface-reacted calcium carbonate having a specific surface area in the range from 20 to 200 m2/g, as measured by the BET method, 0.1 to 10 parts of a dispersant being a polyacrylic acid having a molecular weight in the range of 2000 to 15000 g/mol or a salt or derivative thereof, and 5 to 30 parts of a polymeric binder preferably being a polyacrylic acid or a salt or derivative thereof, optionally a substrate layer comprising one or more individual substrate layers being polymer material layers, and an antimicrobial active composition in an amount from 1 to 50 wt.-%, based on the weight of the coating layer, wherein the antimicrobial active composition comprises, preferably consists of at least one essential oil selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof, and optionally at least one viscosity modifier.

In still another exemplary embodiment of the present invention, the sheet-like element comprises a coating layer comprising 100 parts by weight of a particulate filler comprising a surface-reacted calcium carbonate having a specific surface area in the range from 20 to 200 m2/g, as measured by the BET method, in an amount of at least 50 wt.-%, based on the total amount of the particulate filler, 1.5 to 10 parts of a dispersant being a polyacrylic acid having a molecular weight in the range of 2000 to 15000 g/mol or a salt or derivative thereof, and 5 to 30 parts of a polymeric binder preferably being a polyacrylic acid or a salt or derivative thereof, optionally a substrate layer comprising one or more individual substrate layers being polymer material layers, and an antimicrobial active composition in an amount from 1 to 50 wt.-%, based on the weight of the coating layer, wherein the antimicrobial active composition comprises, preferably consists of at least one essential oil selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof, and optionally at least one viscosity modifier.

In yet another exemplary embodiment of the present invention, the sheet-like element comprises a coating layer comprising 100 parts by weight of a particulate filler consisting of a surface-reacted calcium carbonate having a specific surface area in the range from 20 to 200 m2/g, as measured by the BET method, 1.5 to 10 parts of a dispersant being a polyacrylic acid having a molecular weight in the range of 2000 to 15000 g/mol or a salt or derivative thereof, and 5 to 30 parts of a polymeric binder preferably being a polyacrylic acid or a salt or derivative thereof, optionally a substrate layer comprising one or more individual substrate layers being polymer material layers, and an antimicrobial active composition in an amount from 1 to 50 wt.-%, based on the weight of the coating layer, wherein the antimicrobial active composition comprises, preferably consists of at least one essential oil selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof, and optionally at least one viscosity modifier.

In another embodiment of the present invention, the sheet-like element further comprises one or more adhesive layers, being located on the substrate layer on the opposite side of the coating layer and/or between the individual substrate layers, wherein the adhesive layer preferably is selected from the group consisting of adhesives, sealants, rubber coatings, pressure-sensitive layers and mixtures of the foregoing. If the adhesive layer is present, the adhesive layer is used for temporarily or permanently fixing the sheet-like element on the inner surface of a food packaging, or for temporarily fixing the sheet-like element on a sheet-like element supply device as described hereinbelow. However, in the absence of an adhesive layer, the sheet-like element may be simply placed loosely into a food packaging. If the adhesive layer is present between the individual substrate layers, the adhesive layer allows for an improved adhesion of the individual substrate layers, thus improving the longevity and durability of the sheet-like element.

Suitable materials for the adhesive layer are known to the skilled person and include those listed under section 175.105, 21 Code of Federal Regulations (CFR). Specific examples include polyethylene imine, polyurethane, polyacrylates and starch. Suitable materials for pressure-sensitive layers include those listed under section 175.125, 21 CFR.

In another embodiment of the present invention, the sheet-like element further comprises one or more primer layers, being located between the substrate layer and the coating layer. The primer layer may be selected from any suitable material known to the skilled person and preferably is selected from the group comprising polyurethanes, ethylene vinyl acetates, polyvinyl chlorides, nitrocellulose, acrylates, ethylene acrylates, polyacrylonitriles (acrylics) and mixtures thereof. More preferably, the primer layer is formed from aqueous dispersions comprising acrylates, ethylene acrylates, polyacrylonitriles, polyurethanes and/or nitrocellulose. Optionally, the primer layer further comprises a polysicilic acid. If the primer layer is present between the substrate layer and the coating layer, the primer layer allows for an improved adhesion of the individual substrate layers and/or between the substrate layer and the coating layer, thus improving the longevity and durability of the sheet-like element.

In yet another embodiment of the present invention, the sheet-like element further comprises one or more breathable covering layers to permanently cover the coating layer. The term "breathable" covering layer in the meaning of the present invention refers to a covering layer that allows the passage of gases and vapor, such as the vaporized antimicrobial active composition or water vapor, for example, due to the presence of micropores. The "breathability" of a breathable covering layer can be reflected by its water vapor transmission rate (WVTR), which is specified in g/(m day). For example, a covering layer may be considered as being "breathable" if it has a WVTR of at least 1000 g/(m day). The WVTR may be determined with a Lyssy L80-5000 measuring device according to ASTM E398.

The breathable covering layer allows an essentially unimpeded evaporation of the antimicrobial active composition from the coating layer into the atmosphere of the foodstuff, but prevents the coating layer and the foodstuff from being in direct contact with each other. Thus, it is preferred that the breathable covering layer is selected from the group consisting of breathable film layers, fibrous material layers and nonwoven fabric layers. Breathable film layers may be made from materials such as polyethylene, polypropylene or polyethylene terephthalate. Suitable breathable film layers include those disclosed in WO 2016/023937 A1. Suitable fibrous material layers and nonwoven fabric layers for use as the breathable covering layers include those as described hereinabove within context of the substrate layer.

In another embodiment of the present invention, the sheet-like element further comprises one or more protective layers to temporarily seal the coating layer, and/or the adhesive layer, wherein the protective layer is preferably selected from polyethylene, polypropylene and/or coated paper. The protective layer shields the coating layer from environmental influences, such as contamination by dirt or grease, until the sheet-like element is used, i.e., is loaded with the antimicrobial active composition and placed into a food packaging. If the sheet-like element is already loaded with the antimicrobial active composition, the protective layer further prevents the antimicrobial active composition from evaporating prior to the intended use. Thus, it is a requirement that the protective layer can be removed from the coating layer without damaging said coating layer. Preferably, the protective layer is made from any polymeric material, such as polyethylene, polypropylene or polystyrene, or coated paper. If a breathable covering layer is present in the sheet-like element, the protective layer is placed onto the breathable covering layer.

The sheet-like element may have a size which is adjusted according to the specific needs of the application, e.g., the size of the food packaging and/or the type and the amount of foodstuff within the package. The sheet-like element may e.g. be in the form of an angled or round patch or piece. The antimicrobial active composition-releasing area or size of the sheet-like element may be in the range from 10 to 200 cm2, preferably from 15 to 150 cm2 and more preferably from 18 to 100 cm2.

In one embodiment of the present invention, two or more of the sheet-like elements as described hereinabove are combined to form a stacked sheet-like element. It is appreciated that the two or more sheet-like elements may be the same or different sheet-like elements. The two or more sheet-like elements are combined such that the coating layer of each individual sheet-like element is not obstructed or only slightly obstructed. The term "slightly obstructed" means that at most 25%, preferably at most 15%, more preferably at most 10% of the antimicrobial active composition-releasing area of the sheet-like element are obstructed or sealed. Thus, it is preferred that the two or more sheet-like elements are combined by the use of an intermittent adhesive layer, e.g., by the use of glue points, which preferably are placed in between the two or more sheet like elements such that at most 25%, preferably at most 15%, more preferably at most 10% of the antimicrobial active composition-releasing area of the sheet-like element are obstructed or sealed. Thus, the size of the stacked sheet-like element may be smaller than the antimicrobial active composition-releasing area.

In another embodiment of the present invention, one or more of the sheet-like elements as described hereinabove are combined with another functional coating layer. The one or more of the sheet-like elements is combined with the functional coating layer such that the coating layer of each individual sheet-like element and each functional coating layer is not obstructed or only slightly obstructed, e.g., by the use of an intermittent adhesive layer as defined above. The functional coating layer may be selected from the group comprising moisture control layers, corrosion inhibition layers, metal-chelating layers, oxygen control layers, temperature monitoring layers, radio-frequency identification (RFID) layers, security printing layers and metallized film layers, e.g., for microwavable packaging.

The sheet-like element may be manufactured using a process as described hereinbelow.

The Coating Layer

According to a second aspect of the present invention, a coating layer loaded with an antimicrobial active composition suitable for use in a food packaging is provided. The coating layer comprises 100 parts by weight of a particulate filler comprising a surface-reacted calcium carbonate in an amount of at least 50 wt.-%, based on the total amount of the particulate filler, 0.1 to 10 parts by weight of a dispersant, and 5 to 30 parts by weight of a polymeric binder. The coating layer further comprises an antimicrobial active composition comprising at least one antimicrobial active ingredient preferably having a vapor pressure in the range from 1 to 500 Pa at 25° C. in an amount from 1 to 50 wt.-%, based on the total weight of the coating layer. It is appreciated that the particulate filler, the surface-reacted calcium carbonate, the dispersant, the polymeric binder and the antimicrobial active composition comprising at least one antimicrobial active ingredient are as described hereinabove.

The coating layer may comprise the particulate filler in an amount from 60 to 98 wt.-%, preferably from 70 to 95 wt.-% and more preferably from 75 to 92 wt.-%, based on the total dry weight of the coating layer. Additionally or alternatively, the coating layer may comprise the dispersant in an amount from 0.1 to 10 wt.-%, preferably from 0.5 to 7 wt.-% and more preferably from 1.0 to 4 wt.-%, or, alternatively, from 1.0 to 10 wt.-%, based on the total dry weight of the coating layer. Additionally or alternatively, the coating layer may comprise the binder in an amount of from 1.9 wt.-% to 30 wt.-%, preferably from 4.5 wt.-% to 23 wt.-%, more preferably from 7 to 21 wt.-%, based on the total dry weight of the coating layer.

Preferably, the antimicrobial active composition comprises at least one antimicrobial active ingredient having a vapor pressure in the range from 10 to 400 Pa at 25° C., preferably from 25 to 300 Pa at 25° C., and most preferably from 50 to 250 Pa at 25° C.

Furthermore, the coating layer may contain further additives such as a rheology modifier, a viscosity enhancer, a wetting agent, a wax, an antistatic agent, and/or an anti-foaming agent. Suitable viscosity modifiers include thickening agents, such as the thickening agents described hereinabove. The coating layer may comprise up to 5 parts by weight, preferably up to 3 parts by weight of the further additive. According to one embodiment, the coating layer further comprises the at least one additive in an amount of from 0.05 to 4.2 wt. %, preferably from 0.1 to 2.0 wt. %, more preferably from 0.2 to 1.0 wt. %, based on the total dry weight of the coating layer.

Thus, in one embodiment of the present invention, the coating layer comprises the particulate filler in an amount from 60 to 98 wt.-%, the dispersant in an amount from 0.1 to 10 wt.-%, the binder in an amount from 1.9 to 30 wt.-%, and optionally further additives in an amount of 0 to 4.2 wt.-%, each based on the total dry weight of the coating layer.

It is appreciated that the amount of the particulate filler, the binder, the dispersant and the optional further additives add up to 100 wt.-%, based on the total dry weight of the coating layer. Thus, in one embodiment, the coating layer does not comprise further additives, and the amount of the particulate filler, the binder and the dispersant add up to 100 wt.-%, based on the total dry weight of the coating layer. Furthermore, it is appreciated that the amount of the particulate filler, the binder, the dispersant, the optional further additives and the antimicrobial active composition preferably add up to 100 wt.-%, based on the total weight of the coating layer. Thus, in one embodiment, the coating layer does not comprise further additives, and the amount of the particulate filler, the binder, the dispersant and the antimicrobial active composition add up to 100 wt.-%, based on the total weight of the coating layer.

The coating layer of the present invention has a total intruded specific pore volume in the range from 0.25 to 2 cm3/g, as measured by mercury intrusion porosimetry. In a preferred embodiment, the total intruded specific pore volume is in the range from 0.4 to 1.5 cm3/g, and more preferably from 0.5 to 1.0 cm3/g, as measured by mercury intrusion porosimetry.

In a preferred embodiment, the coating layer has

- a total intra particle intruded specific pore volume in the range from 0.05 to 1.0 $cm^3/g$, preferably from 0.08 to 0.5 $cm^3/g$, and more preferably from 0.1 to 0.4 $cm^3/g$, as measured by mercury intrusion porosimetry,
- a total inter particle intruded specific pore volume in the range from 0.05 to 0.5 $cm^3/g$, preferably from 0.08 to 0.4 $cm^3/g$, and more preferably from 0.1 to 0.3 $cm^3/g$, as measured by mercury intrusion porosimetry, and/or
- a total occlusion intruded specific pore volume in the range from 0.05 to 0.4 $cm^3/g$, preferably from 0.08 to 0.3 $cm^3/g$, and more preferably from 0.1 to 0.2 $cm^3/g$, as measured by mercury intrusion porosimetry.

The coating layer of the present invention has a high fluid receptivity. In a preferred embodiment, the coating layer has a fluid receptivity in the range from 1 to 50 wt.-%, more preferably from 10 to 45 wt.-%, and most preferably from 15 to 35 wt.-%. Thus, the coating layer is loaded with high amounts of the antimicrobial active composition without delamination of the coating layer and without leakage of the antimicrobial active composition.

In one embodiment, the coating layer loaded with an antimicrobial active composition suitable for use in a food packaging comprises a) 100 parts by weight of a particulate filler comprising a surface-reacted calcium carbonate in an amount of at least 50 wt.-%, based on the total amount of the particulate filler,
   wherein the surface-reacted calcium carbonate is a reaction product of natural ground calcium carbonate or precipitated calcium carbonate with carbon dioxide and one or more $H_3O$+ ion donors, wherein the carbon dioxide is formed in situ by the $H_3O$ ion donors treatment and/or is supplied from an external source, and
   wherein the surface-reacted calcium carbonate has a specific surface area in the range from 20 to 200 $m^2/g$, preferably 50 to 120 $m^2/g$, as measured by the BET method,
b) 1.5 to 10 parts by weight of a dispersant,
c) 5 to 30 parts by weight of a polymeric binder, and
d) an antimicrobial active composition comprising at least one antimicrobial active ingredient preferably having a vapor pressure in the range from 1 to 500 Pa at 25° C. in an amount from 1 to 50 wt.-%, based on the total weight of the coating layer, wherein the coating layer has a total intruded specific pore volume in the range from 0.25 to 2 $cm^3/g$, as measured by mercury intrusion porosimetry.

In a preferred embodiment, the coating layer comprises the dispersant in an amount from 1 to 5 parts by weight, more preferably from 1.5 to 3 parts by weight, and/or the coating layer comprises the polymeric binder in an amount of from 5 to 20 parts by weight, more preferably from 8 to 15 parts by weight. The coating layer may comprise the dispersant in an amount from 0.5 to 7 wt.-% and more preferably from 1.0 to 4 wt.-%, based on the total dry weight of the coating layer. The coating layer may comprise the binder in an amount from 4.5 wt.-% to 23 wt.-%, more preferably from 7 to 21 wt.-%, based on the total dry weight of the coating layer.

In a different preferred embodiment, the coating layer comprises the dispersant in an amount from 1.5 to 10 parts by weight, and/or the coating layer comprises the polymeric binder in an amount of from 5 to 20 parts by weight, more preferably from 8 to 15 parts by weight. The coating layer may comprise the dispersant in an amount from 1.0 to 10 wt.-%, based on the total dry weight of the coating layer. The coating layer may comprise the binder in an amount from 4.5 wt.-% to 23 wt.-%, more preferably from 7 to 21 wt.-%, based on the total dry weight of the coating layer.

It is appreciated that the coating layer can be formed by any means known to the skilled person. The coating layer may be applied directly onto the inner side of a food packaging without the need for a separate substrate. Preferably, the coating layer is present on the inner side of the food packaging in an amount from 1 to 70 g/m2, preferably from 2 to 50 g/m2, more preferably from 10 to 50 g/m2 and most preferably from 25 to 50 g/m2. The coating layer may be applied to the food packaging by a process as described hereinbelow, preferably by a roller coating step.

In a preferred embodiment of the present invention, the coating layer comprises the antimicrobial active composition in an amount from 1 to 50 wt.-%, based on the total weight of the coating layer, preferably in an amount from 5 to 45 wt.-%, or from 10 to 45 wt.-%, and most preferably in an amount from 15 to 35 wt.-%. In a particularly preferred embodiment of the present invention, the sheet-like element comprises an antimicrobial active composition in an amount from 1 to 50 wt.-%, based on the total weight of the coating layer, preferably in an amount from 5 to 45 wt.-%, or from 10 to 45 wt.-%, and most preferably in an amount from 15 to 35 wt.-%, wherein the antimicrobial active composition consists of at least one essential oil and optionally at least one viscosity modifier.

Thus, in an exemplary embodiment of the present invention, the coating layer comprises 100 parts by weight of a particulate filler comprising a surface-reacted calcium carbonate having a specific surface area in the range from 20 to 200 m2/g, as measured by the BET method, in an amount of at least 50 wt.-%, based on the total amount of the particulate filler, 0.1 to 10 parts of a dispersant being a polyacrylic acid having a molecular weight in the range of 1000 to 15000 g/mol or a salt or derivative thereof, and 5 to 30 parts of a polymeric binder preferably being a polyacrylic acid or a salt or derivative thereof and an antimicrobial active composition in an amount from 1 to 50 wt.-%, based on the weight of the coating layer, wherein the antimicrobial active composition comprises, preferably consists of an essential oil selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof, and optionally at least one viscosity modifier.

Thus, in another exemplary embodiment of the present invention, the coating layer comprises 100 parts by weight of a particulate filler consisting of a surface-reacted calcium carbonate having a specific surface area in the range from 20 to 200 m2/g, as measured by the BET method, 0.1 to 10 parts of a dispersant being a polyacrylic acid having a molecular weight in the range of 1000 to 15000 g/mol or a salt or derivative thereof, and 5 to 30 parts of a polymeric binder preferably being a polyacrylic acid or a salt or derivative thereof and an antimicrobial active composition in an amount from 1 to 50 wt.-%, based on the weight of the coating layer, wherein the antimicrobial active composition comprises, preferably consists of an essential oil selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof, and optionally at least one viscosity modifier.

In another embodiment of the present invention, the coating layer of the present aspect corresponds to the coating layer as described hereinabove in relation to the sheet-like element.

The inventors surprisingly found that the inventive coating layer can be applied directly on the inner side of a food packaging without the need for a substrate layer. The inventive coating layer has a high porosity due to the interplay of the particulate filler comprising the surface-reacted calcium carbonate, the dispersant and the polymeric binder in the specified amounts. While the surface-reacted calcium carbonate has a high BET surface area and a high porosity and is able to host high amounts of the antimicrobial active composition, the amount of dispersant and binder is critical in order to provide the desired loading and release properties. It is assumed that the dispersant in the specified amount is able to reduce aggregation of the particulate filler comprising the surface-reacted calcium carbonate while rendering its pores accessible to the antimicrobial active composition. The amount of binder is selected in order to allow for sufficient adhesion and even distribution of the coating layer on the substrate layer. However, the pores of the surface-reacted calcium carbonate need to remain accessible. The inventors found that the resulting specific coating layer according to the present invention is able to absorb suitably high amounts of antimicrobial active compositions and/or ingredients. Furthermore, the coating layer of the inventive sheet-like element can be loaded with a defined amount of an antimicrobial active ingredient by easily applicable methods, e.g., by spraying, coating or dripping.

When the coating layer is present in a food packaging and is loaded with an antimicrobial active composition, the antimicrobial active ingredient diffuses out of the coating layer over an extended time to provide a protective atmosphere, which prevents or retards microbial contamination of the foodstuff. At the same time, the coating layer is physically separated from the foodstuff and does not contaminate the foodstuff, as opposed to a powder of a porous carrier material loaded with the antimicrobial active composition. It is also avoided that the antimicrobial active agent is processed under high temperatures in order not to negatively affect the stability of the antimicrobial active composition.

The Inventive Process

According to a third aspect of the present invention, a process for the manufacture of a sheet-like element suitable for use in a food packaging is provided. The process comprises the steps of.

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, preferably 50 to 120 $m^2/g$, as measured by the BET method,
b) providing a dispersant,
c) providing a polymeric binder,
d) providing a substrate layer comprising one or more individual substrate layers,
e) mixing 100 parts by weight of the particulate filler of step a), 0.1 to 10 parts by weight of the dispersant of step b) and 5 to 30 parts by weight of the polymeric binder of step c) to obtain a coating composition,
f) applying the coating composition of step e) onto the substrate layer of step d) to form a composite,
g) drying the composite obtained in step f) to obtain a sheet-like element,
h) optionally adding an antimicrobial active composition comprising at least one antimicrobial active ingredient, preferably having a vapor pressure in the range from 1 to 500 Pa at 25° C., during any one or more of steps a) to g) or after step g) in a total amount from 1 to 50 wt.-%, based on the total weight of the coating layer.

It is appreciated that in step a) of the inventive process, a particulate filler as described hereinabove is provided. Furthermore, the dispersant provided in step b) of the inventive process, the polymeric binder provided in step c) of the inventive process and the substrate layer provided in step d) of the inventive process are as described hereinabove. The particulate filler of step a), the dispersant of step b) and/or the polymeric binder of step c) may be independently from each other provided in a pure form, or, alternatively, in the form of a solution or suspension, wherein at least one of the particulate filler of step a), the dispersant of step b) and/or the polymeric binder of step c) is provided in the form of a solution or suspension or is dissolved or suspended in a solvent prior to mixing step e).

Preferably, the sheet-like element obtained in step g) comprises a coating layer having a total intruded specific pore volume in the range from 0.25 to 2 cm3/g, more preferably from 0.4 to 1.5 cm3/g, and most preferably from 0.5 to 1.0 cm3/g, as measured by mercury intrusion porosimetry.

Thus, the present invention relates in a preferred embodiment to a process for the manufacture of a sheet-like element suitable for use in a food packaging, the process comprising the steps of:

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, preferably 50 to 120 $m^2/g$, as measured by the BET method,
b) providing a dispersant,
c) providing a polymeric binder,
d) providing a substrate layer comprising one or more individual substrate layers,
e) mixing 100 parts by weight of the particulate filler of step a), 0.1 to 10 parts by weight of the dispersant of step b) and 5 to 30 parts by weight of the polymeric binder of step c) to obtain a coating composition,
f) applying the coating composition of step e) onto the substrate layer of step d) to form a composite,
g) drying the composite obtained in step f) to obtain a sheet-like element,
h) optionally adding an antimicrobial active composition comprising at least one antimicrobial active ingredient, preferably having a vapor pressure in the range from 1 to 500 Pa at 25° C., during any one or more of steps a) to g) or after step g) in a total amount from 1 to 50 wt.-%, based on the total weight of the coating layer, wherein the sheet-like element obtained in step g) comprises a coating layer having a total intruded specific pore volume in the range from 0.25 to 2 $cm^3/g$, more preferably from 0.4 to 1.5 $cm^3/g$, and most preferably from 0.5 to 1.0 $cm^3/g$, as measured by mercury intrusion porosimetry.

In a preferred embodiment of the present invention, the polymeric binder of step c) is provided in the form of a solution, more preferably an aqueous solution. In a particularly preferred embodiment of the present invention, the polymeric binder of step c) is provided in the form of an aqueous solution having a pH value of at least 7, preferably at least 8, for example from 8 to 12, such as from 8 to 10. The pH value may be adjusted using any acid or base known to the skilled person. If the pH value of the solution is below 7, it is preferred that the pH value is adjusted using an aqueous solution of a base, such as a sodium hydroxide solution. Adjusting the pH value to the specified range may improve the swelling properties of the polymeric binder.

In mixing step e), 100 parts by weight of the particulate filler of step a), 0.1 to 10 parts by weight of the dispersant of step b) and 5 to 30 parts by weight of the polymeric binder of step c), and optionally at least one solvent, preferably water, are mixed to obtain a coating composition.

The coating composition may comprise the particulate filler in an amount from 60 to 98 wt.-%, preferably from 70 to 95 wt.-% and more preferably from 75 to 92 wt.-%, based on the total dry weight of the coating composition. Additionally or alternatively, the coating composition may comprise the dispersant in an amount from 0.1 to 10 wt.-%, preferably from 0.5 to 7 wt.-% and more preferably from 1.0 to 4 wt.-%, based on the total dry weight of the coating composition. Additionally or alternatively, the coating composition may comprise the binder in an amount of from 1.9 wt.-% to 30 wt.-%, preferably from 4.5 wt.-% to 23 wt.-%, more preferably from 7 to 21 wt.-%, based on the total dry weight of the coating composition.

In a preferred embodiment, the coating composition comprises the dispersant in an amount from 1 to 5 parts by weight, more preferably from 1.5 to 3 parts by weight, and/or the coating composition comprises the polymeric binder in an amount of from 5 to 20 parts by weight, more preferably from 8 to 15 parts by weight. The coating composition may comprise the dispersant in an amount from 0.5 to 7 wt.-% and more preferably from 1.0 to 4 wt.-%, based on the total dry weight of the coating composition. The coating composition may comprise the binder in an amount from 4.5 wt.-% to 23 wt.-%, more preferably from 7 to 21 wt.-%, based on the total dry weight of the coating composition.

In another preferred embodiment, the coating composition comprises the dispersant in an amount from 1.5 to 10 parts by weight, and/or the coating composition comprises the polymeric binder in an amount of from 5 to 20 parts by weight, more preferably from 8 to 15 parts by weight. The coating composition may comprise the dispersant in an amount from 1.0 to 10 wt.-%, based on the total dry weight of the coating composition. The coating composition may comprise the binder in an amount from 4.5 wt.-% to 23 wt.-%, more preferably from 7 to 21 wt.-%, based on the total dry weight of the coating composition.

Thus, one embodiment of the present invention relates to a process for the manufacture of a sheet-like element suitable for use in a food packaging, the process comprising the steps of:

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, preferably 50 to 120 $m^2/g$, as measured by the BET method, b) providing a dispersant, c) providing a polymeric binder, d) providing a substrate layer comprising one or more individual substrate layers, e) mixing 100 parts by weight of the particulate filler of step a), 1.5 to 10 parts by weight of the dispersant of step b) and 5 to 30 parts by weight of the polymeric binder of step c) to obtain a coating composition, f) applying the coating composition of step e) onto the substrate layer of step d) to form a composite, g) drying the composite obtained in step f) to obtain a sheet-like element, h) optionally adding an antimicrobial active composition comprising at least one antimicrobial active ingredient, preferably having a vapor pressure in the range from 1 to 500 Pa at 25° C., during any one or more of steps a) to g) or after step g) in a total amount from 1 to 50 wt.-%, based on the total weight of the coating layer, preferably wherein the sheet-like element obtained in step g) comprises a coating layer having a total intruded specific pore volume in the range from 0.25 to 2 $cm^3/g$, more preferably from 0.4 to 1.5 $cm^3/g$, and most preferably from 0.5 to 1.0 $cm^3/g$, as measured by mercury intrusion porosimetry.

It is appreciated that the amount of the particulate filler, the binder, the dispersant and the optional further additives add up to 100 wt.-%, based on the total dry weight of the coating layer. Thus, in one embodiment, the coating layer does not comprise further additives, and the amount of the particulate filler, the binder and the dispersant add up to 100 wt.-%, based on the total dry weight of the coating layer.

Preferably, mixing step e) is performed in the presence of a solvent. Thus, the coating composition is obtained in the form of a slurry. The solvent may be any solvent allowing for the dispersion of the particulate filler comprising the surface-reacted calcium carbonate, the dispersant, and the polymeric binder within the coating composition, such as water, acetone, ethanol, methanol or butanone. In a particularly preferred embodiment, the solvent is water.

The solids content of the coating composition preferably is in the range from 10 to 80 wt.-%, more preferably 20 to 70 wt.-%, even more preferably 30 to 60 wt.-%, and most preferably 40 to 55 wt.-%, based on the total weight of the coating composition.

During mixing step e), optionally further additives such as a rheology modifier, a viscosity enhancer, a wetting agent, a wax, an antistatic agent, and/or an antifoaming agent may be added. Suitable viscosity modifiers include thickening agents, such as the thickening agents described hereinabove. The coating layer may comprise up to 5 parts by weight, preferably up to 3 parts by weight of the further additive. According to one embodiment, the further additive may be added in an amount of from 0.05 to 4.2 wt. %, preferably from 0.1 to 2.0 wt. %, more preferably from 0.2 to 1.0 wt. %, based on the total dry weight of the coating composition.

Thus, in one embodiment of the present invention, the coating composition comprises the particulate filler in an amount from 60 to 98 wt.-%, the dispersant in an amount from 0.1 to 7 wt.-%, the binder in an amount from 1.9 to 30 wt.-%, and optionally further additives in an amount of 0 to 4.2 wt.-%, each based on the total dry weight of the coating composition.

In application step f), the coating composition of step e) is applied onto the substrate layer of step d) to form a composite. Application step f) can be performed by any means known to the skilled person, e.g., by spraying or coating. Preferably, application step f) is performed by a coating step, more preferably by means of roller coating, dip coating, rod coating, grooved rod coating, curtain coating, stiff blade coating, applicator roll coating, fountain coating, jet coating, short dwell coating, slotted die coating, bent blade coating, bevel blade coating, air knife coating, bar coating, gravure coating, conventional or metering size press coating, spray application techniques, and/or wet stack coating, and most preferably by roller coating.

Preferably, the coating composition is applied to the substrate layer an amount sufficient to yield a coating weight of the final coating layer from 1 to 70 g/m2, preferably from 2 to 50 g/m2, more preferably from 10 to 50 g/m2 and most preferably from 25 to 50 g/m2.

If the sheet-like element further comprises a primer layer, the primer layer is applied to the substrate layer of step d) prior to application step f) in a priming step f1). The primer layer may be applied using any suitable application process known to the skilled person, either in an in-line process, that is, at the same manufacturing process step or using the same apparatus as for the application of the coating composition in application step f), or in an off-line process, that is, using separate equipment for the priming step f1) and the application step f).

Drying step g) may be performed by any method known to the skilled person. Preferably, drying step g) is performed at a temperature in the range from 50 to 150° C. at ambient pressure or at reduced pressure, preferably by hot air drying, IR radiation drying or UV radiation drying. The so-obtained sheet-like element comprises a coating layer, preferably having a total intruded specific pore volume in the range from 0.25 to 2 cm3/g, as measured by mercury intrusion porosimetry. In a preferred embodiment, the total intruded specific pore volume is in the range from 0.4 to 1.5 cm3/g, and more preferably from 0.5 to 1.0 cm3/g, as measured by mercury intrusion porosimetry.

In a preferred embodiment, the coating layer has

- a total intra particle intruded specific pore volume in the range from 0.05 to 1.0 $cm^3$/g, preferably from 0.08 to 0.5 $cm^3$/g, and more preferably from 0.1 to 0.4 $cm^3$/g, as measured by mercury intrusion porosimetry,
- a total inter particle intruded specific pore volume in the range from 0.05 to 0.5 $cm^3$/g, preferably from 0.08 to 0.4 $cm^3$/g, and more preferably from 0.1 to 0.3 $cm^3$/g, as measured by mercury intrusion porosimetry, and/or
- a total occlusion intruded specific pore volume in the range from 0.05 to 0.4 $cm^3$/g, preferably from 0.08 to 0.3 $cm^3$/g, and more preferably from 0.1 to 0.2 $cm^3$/g, as measured by mercury intrusion porosimetry.

The coating layer has a high fluid receptivity. In a preferred embodiment, the coating layer has a fluid receptivity in the range from 1 to 50 wt.-%, more preferably from 10 to 45 wt.-%, and most preferably from 15 to 35 wt.-%. Thus, the coating layer can be loaded with high amounts of the antimicrobial active composition without delamination of the coating layer and without leakage of the antimicrobial active composition.

Optionally, the inventive process further comprises a step h) of adding an antimicrobial active composition comprising at least one antimicrobial active ingredient, preferably having a vapor pressure in the range from 1 to 500 Pa at 25° C., during any one or more of steps a) to g) or after step g) in a total amount from 1 to 50 wt.-%, based on the total weight of the coating layer. It is appreciated that the antimicrobial active composition is as defined hereinabove.

Preferably, the antimicrobial active composition comprises at least one antimicrobial active ingredient having a vapor pressure in the range from 10 to 400 Pa at 25° C., preferably from 25 to 300 Pa at 25° C., and most preferably from 50 to 250 Pa at 25° C.

It is further appreciated that the antimicrobial active composition may be added during any step of the inventive process. For example, if the antimicrobial active composition is added during step a), it is to be understood that a mixture of the particulate filler comprising the surface-reacted calcium carbonate and the antimicrobial active composition is provided in step a). Thus, the particulate filler comprising the surface-reacted calcium carbonate may already be loaded with the antimicrobial active composition. In general, the surface-reacted calcium carbonate and the antimicrobial active composition can be brought into contact by any conventional means known to the skilled person. For example, the particulate filler comprising the surface-reacted calcium carbonate and the antimicrobial active composition may be mixed in the absence or presence of a solvent. Suitable mixing devices are known to the skilled person and may include mixers or blenders, e.g., a tumbling mixer, a ploughshare mixer, such as a Ploughshare® mixer available from Gebrüder Lödige Maschinenbau GmbH or a laboratory mixer, such as an MP mixer available from Somakon Verfahrenstechnik UG. The skilled person will adapt the mixing conditions (such as the configuration of mixing speed) according to his needs and available equipment.

According to one exemplary embodiment, the antimicrobial active composition is in form of a suspension or solution, and the contacting step is carried out by dropwise addition of the antimicrobial active composition to an agitated powder of the particulate filler comprising the surface-reacted calcium carbonate. According to another exemplary embodiment, the antimicrobial active composition is provided in liquid or molten form and added to the particulate filler comprising the surface-reacted calcium carbonate.

In another embodiment of the present invention, the antimicrobial active composition may be provided as a mixture with the dispersant of step b), the polymeric of step c), or may be admixed during mixing step e) into the coating composition.

However, it is particularly preferred that the antimicrobial active composition is added to the sheet-like element after drying step g). In this embodiment, addition step h) may be performed by any means known to the skilled person, preferably by inkjet printing, spraying, coating, vapor deposition, and/or dripping, on at least a part of the surface of the coating layer. In one embodiment, addition step h) is performed by coating. It is to be understood that the antimicrobial active composition may be applied by any coating means known to the skilled person, including, but not limited to roller coating, dip coating, rod coating, grooved rod coating, curtain coating, stiff blade coating, applicator roll coating, fountain coating, jet coating, short dwell coating, slotted die coating, bent blade coating, bevel blade coating, air knife coating, bar coating, gravure coating, conventional or metering size press coating, spray application techniques, spin coating, and/or wet stack coating, preferably dip coating, slotted die coating and/or spin coating.

In a preferred embodiment, addition step h) is performed by inkjet printing.

In a particularly preferred embodiment, addition step h) is performed by spraying.

In a preferred embodiment of the present invention, the antimicrobial active composition is added in step h) to the sheet-like element in an amount from 5 to 45 wt.-%, based on the total weight of the coating layer, and most preferably in an amount from 10 to 30 wt.-%, based on the total weight of the coating layer. Alternatively, the antimicrobial active composition is added in step h) to the sheet-like element in an amount from 10 to 45 wt.-%, preferably from 15 to 35 wt.-%, based on the total weight of the coating layer. In a particularly preferred embodiment of the present invention, the antimicrobial active composition is added in step h) to the sheet-like element in an amount from 1 to 50 wt.-%, based on the total weight of the coating layer, preferably in an amount from 5 to 45 wt.-%, or from 10 to 45 wt.-%, and most preferably in an amount from 10 to 30 wt.-%, or from 15 to 35 wt.-%, based on the total weight of the coating layer, wherein the antimicrobial active composition consists of at least one essential oil and optionally at least one viscosity modifier.

In another embodiment of the present invention, the at least one antimicrobial active composition is added during two or more of steps a) to g) or after step g). For example, one portion of the antimicrobial composition may be added to the particulate filler comprising the surface-reacted calcium carbonate of step a), i.e., the surface-reacted calcium carbonate may already be loaded with one portion of the antimicrobial active composition. Said one portion of the antimicrobial active composition may be an essential oil. In this exemplary embodiment, another portion of the antimicrobial active composition may be added to the sheet-like element after drying step g). Said other portion of the antimicrobial active composition may be the same or a different essential oil than the one portion of the antimicrobial active composition.

Addition step h) may be performed directly after the production of the sheet-like element, i.e., already at the manufacturing site. In this case, it is preferred that a protective layer as described hereinabove is applied to the sheet-like element in order to prevent the antimicrobial active composition from evaporating during storage.

However, it is particularly preferred that addition step h) is performed immediately before or shortly before the sheet-like element comprising the loaded coating layer is placed inside the food packaging. Thus, the amount of the antimicrobial active composition can be precisely adjusted according to the requirements of the packaging. In other words, it is preferred that the sheet-like element is shipped and stored in the non-loaded state, i.e., not comprising the antimicrobial active composition.

Optionally, the inventive process further comprises a printing step i). The sheet-like element may be printed with a pattern, a logo, a text or other information. The printing ink may be applied to the inventive coating layer and/or on the opposite side of the inventive coating layer on the substrate layer. In the latter alternative, it is preferred that the outermost individual substrate layer is a print receptive coating layer as described hereinabove. Printing methods suitable for use in the present invention include inkjet, offset, flexographic and gravure printing.

Optionally, the inventive process further comprises a cutting step j). The sheet-like element may be cut into several pieces having a predetermined size. The size of the pieces is adjusted according to the specific needs of the application, e.g., the size of the food packaging or the type of foodstuff. The antimicrobial active composition-releasing area or size of the pieces may be in the range from 10 cm2 to 200 cm2, preferably from 15 to 150 cm2 and more preferably from 18 to 100 cm2.

The Inventive Sheet-Like Element Supply Device

A fourth aspect of the present invention relates to a sheet-like element supply device comprising the inventive sheet-like element.

The inventive sheet-like element supply device comprises the sheet-like element of any of the foregoing aspects of the present invention. Preferably, the supply device comprises a roll or a magazine comprising the sheet-like elements. The supply device may be a label dispenser or a label applicator comprising said roll and/or magazine. However, the supply device may also be a sheet comprising at least two of the inventive sheet-like elements. Thus, it is preferred that the sheet-like elements can be reversibly and non-destructively removed from the supply device.

Thus, the sheet-like element can be easily dispensed and provided at the point of use.

The Inventive Food Packaging

A fifth aspect of the present invention relates to a food packaging comprising the inventive sheet-like element, wherein the sheet-like element is located within the food packaging, or comprising the inventive coating layer, wherein the coating layer is present within the food packaging. It is appreciated that the sheet-like element and the coating layer are as defined hereinabove.

The sheet-like element and the coating layer are configured to be loaded with an antimicrobial active composition as defined hereinabove. Thus, the antimicrobial active composition is applied to the sheet-like element or to the coating layer within the inventive food packaging before, during or after the foodstuff is packed into the inventive food packaging. The sheet-like element loaded with the antimicrobial active composition is placed inside the food packaging before, during or after the foodstuff is packed into the food packaging.

In a preferred embodiment, the food packaging comprising the inventive sheet-like element or the inventive coating layer and the foodstuff further comprises a modified atmosphere. Modified atmosphere packaging of foodstuffs is well-known to the skilled person. The atmosphere in the food packaging comprises reduced levels of oxygen, i.e., less than 20 vol.-%, based on the total volume of the packaging atmosphere, more preferably less than 5 vol. % and most preferably less than 2 vol.-%. The modified atmosphere preferably consists essentially of nitrogen and carbon dioxide, preferably in a volume ratio from 1:10 to 10:10, more preferably 1:5 to 5:1, and most preferably 1:3 to 3:1, for example about 2:1 or about 1:1. It is appreciated that the inventive food packaging is closed or sealed after the food packaging is filled with the sheet-like element loaded with the antimicrobial active composition or the coating layer loaded with the antimicrobial active composition, the foodstuff, and optionally the modified atmosphere. The food packaging may be closed or sealed by any means known to the skilled person.

In a preferred embodiment of the present invention, the food packaging is sealed, preferably by heat-sealing, pressure sealing and/or ultrasonic welding, more preferably in combination with a sealing agent. Preferred sealing agents for use in the present invention include pressure-sensitive adhesives selected from the group consisting of permanent pressure-sensitive adhesives, removable pressure-sensitive adhesives, and resealable pressure-sensitive adhesives, preferably resealable pressure-sensitive adhesives.

Within the inventive food packaging, the antimicrobial active composition evaporates from the sheet-like element or the coating layer over an extended time period, exerts an antimicrobial effect on the foodstuff and, thus, prevents or retards food spoilage and/or increases the shelf life of the foodstuff.

The present invention is not limited to any particular kinds of foodstuffs. In an embodiment of the present invention, the foodstuff is selected from the group comprising raw and processed meat, such as poultry, beef, pork, ham, sausage; raw and processed fish; dairy products, such as cheese, e.g., sliced cheese or grated cheese; bakery products, such as bread, toast bread, cakes, cookies; vegetables; sweets, ready-to-eat foods, and the like.

When the inventive sheet-like element or the inventive coating layer within the food packaging is loaded with an antimicrobial active composition, and said food packaging is used to pack a foodstuff, a protective atmosphere is provided within the food packaging, which prevents or retards spoilage of the foodstuff. The present inventors recognized that an additional or synergistic antimicrobial effect can be achieved by the combined use of the inventive sheet-like element or the inventive coating layer loaded with an antimicrobial active composition and modified atmosphere packaging, and thus, an advantageous effect on the shelf life extension.

The Inventive Uses

A sixth aspect of the present invention relates to the use of the inventive sheet-like element in a food packaging. It is appreciated that the sheet-like element and the food packaging are as described hereinabove.

A seventh aspect of the present invention relates to the use of the inventive sheet-like element and/or the inventive coating layer for achieving an antimicrobial and/or antifungal and/or anti-mould and/or antifouling effect in a food packaging.

As described in detail hereinabove, the inventive sheet-like element loaded with the antimicrobial active composition provides a packaging atmosphere comprising the vapor of the antimicrobial active ingredient by evaporation of the same over an extended period of time. Thus, the inventive sheet-like element and/or the inventive coating layer achieves an antimicrobial and/or antifungal and/or anti-mould and/or antifouling effect in a food packaging, i.e., prevents or retards the growth of pathogenic microorganisms.

The inventive sheet-like element loaded with the antimicrobial active composition comprises the antimicrobial active ingredient in an amount sufficient for obtaining the desired antimicrobial and/or antifungal and/or anti-mould and/or antifouling effect in the food packaging. The skilled person will adjust, e.g., the size of the sheet-like element, the composition and the amount of the coating layer present on the substrate layer, and the amount of the antimicrobial active composition loaded onto the inventive sheet-like element as taught herein in order to obtain the desired antimicrobial and/or antifungal and/or anti-mould and/or antifouling effect in the food packaging. For example, the total area and/or amount of the inventive sheet-like element loaded with the antimicrobial active composition may be adjusted such that the inventive antimicrobial active composition is present within the food packaging in an amount from 0.2 to 25 mg/g foodstuff, preferably from 0.4 to 10 mg/g foodstuff, more preferably from 1 to 3 mg/g foodstuff, e.g., about 2 mg/g foodstuff. Alternatively, the total area and/or amount of the inventive sheet-like element loaded with the antimicrobial active composition may be adjusted such that the antimicrobial active composition is present within the food packaging in an amount from 0.05 to 10 mg/cm3 headspace, preferably from 0.1 to 5 mg/cm3 headspace, more preferably from 0.2 to 2 mg/cm3 headspace, e.g., about 0.4 mg/cm3 headspace. For the purposes of the present invention, the "headspace" of a food packaging is considered to be the amount of gas (e.g., air or modified atmosphere) present in the food packaging.

Preferably, the foodstuff is stored at common temperatures for the storage of cooled or refrigerated foodstuffs, that is, from 0° C. to 14° C., preferably from 3 to 10° C., more preferably from 4 to 7° C., e.g., at 7±1° C. However, the foodstuff may also be stored at room temperature, that is, from 15° C. to 30° C., preferably from 18° C. to 25° C., for example from 18° C. to 22° C.

Thus, the shelf life of the foodstuff in the food packaging can be extended. Preferably the shelf-life is extended by at least 10%, preferably by at least 20%, more preferably by at least 30%, and most preferably by at least 50%, compared to the same food packaging not comprising the sheet-like element at a storage temperature of 7±1° C. For example, the shelf life of the foodstuff may be extended by at least 2 days, preferably at least 3 days, more preferably at least 5 days, and most preferably at least 10 days, compared to the same food packaging not comprising the sheet-like element at a storage temperature of 7±1° C. For the purposes of the present invention, the foodstuff is considered to have reached the end of shelf life, if the amount of microbial contamination exceeds 3.3 log cfu/g, as defined by the European Food Safety Agency (EFSA). The amount of microbial contamination may be determined as described hereinbelow.

In a preferred embodiment of the present invention, the inventive sheet-like element is used in combination with modified atmosphere packaging as described above in order to achieve a synergistic antimicrobial effect and a synergistic effect on the shelf life extension. Thus, the shelf life of the foodstuff in the food packaging can be extended. Preferably the shelf-life is extended by at least 10%, preferably by at least 20%, more preferably by at least 30% and most preferably by at least 50%, compared to the same food packaging not comprising the sheet-like element at a storage temperature of 7±1° C. For example, the shelf life of the foodstuff may be extended by at least 2 days, preferably at least 3 days, more preferably at least 5 days, and most preferably at least 10 days, compared to the same food packaging not comprising the sheet-like element at a storage temperature of 7±1° C.

In another embodiment of the present invention, the shelf-life is extended by at least 10%, preferably by at least 20%, more preferably by at least 30%, and most preferably by at least 50%, compared to the same food packaging not comprising the sheet-like element at a storage temperature of 20±2° C. For example, the shelf life of the foodstuff may be extended by at least 2 days, preferably at least 3 days, more preferably at least 5 days, and most preferably at least 10 days, compared to the same food packaging not comprising the sheet-like element at a storage temperature of 20±2° C. For the purposes of the present invention, the foodstuff is considered to have reached the end of shelf life, if the amount of microbial contamination exceeds 3.3 log cfu/g, as defined by the European Food Safety Agency (EFSA). The amount of microbial contamination may be determined as described hereinbelow.

In yet another embodiment of the present invention, the inventive sheet-like element is used in combination with modified atmosphere packaging as described above in order to achieve a synergistic antimicrobial effect and a synergistic effect on the shelf life extension. Thus, the shelf life of the foodstuff in the food packaging can be extended. Preferably the shelf-life is extended by at least 10%, preferably by at least 20%, more preferably by at least 30% and most preferably by at least 50%, compared to the same food packaging not comprising the sheet-like element at a storage temperature of 20±2° C. For example, the shelf life of the foodstuff may be extended by at least 2 days, preferably at least 3 days, more preferably at least 5 days, and most preferably at least 10 days, compared to the same food packaging not comprising the sheet-like element at a storage temperature of 20±2° C.

Common pathogenic microorganisms, which can be found in foodstuffs, and the growth of which can be prevented or retarded in the present invention, include *Campylobacter jejuni, Escherichia coli, Listeria monocytogenes, Salmonella* spp., *Salmonella enterica, Listeria innocua, Lactobacillus sakei, Bronchotrix thermosphacta, Clostridium perfringens, Clostridium botulinum, Campylobacter* spp., *Staphylococcus aureus, Streptococcus*, Norovirus, *Toxoplasma gondii, Cyclospora* spp., *Bacillus cereus, Cronobacter sakazakii, Shigella* spp., *Vibrio* spp., *Vibrio cholerae, Vibrio parahaemolyticus, Vibrio vulnificus, Yersinia enterocolitica, Yersinia pseudotuberculosis, Brucella* spp., *Corynebacterium ulcerans, Coxiella burnetii, Plesiomonas shigelloides, Aeromonas hydrophila, Aeromonas caviae, Aeromonas sobria, Rhizopus stolonifer, Penicillium commune, Aspergillus parasiticus, Aspergillus flavus, Alternaria* spp., *Fusarium moniliforme, Cephalosporium, Fusarium, Myrothecium, Stachybotrys*, and *Trichoderma*, Hepatitis A, *Cyclospora cayetanensis*, and *Trichinella spiralis*.

The scope and interest of the invention will be better understood based on the following examples which are intended to illustrate certain embodiments of the present invention and are non-limitative.

EXPERIMENTAL PART

Materials and Methods

The Particulate Filler

In the examples, a surface-reacted calcium carbonate SRCC having a weight median particle size of 6.6 m, a weight-based top cut (d98) of 14.5 m, a BET specific surface area of 60 m2/g, and an intra-particle intruded specific pore volume of 0.939 cm3/g (for the pore diameter range of 0.004 to 0.51 μm) was used as the particulate filler.

SRCC was obtained by preparing 350 litres of an aqueous suspension of ground calcium carbonate in a mixing vessel by adjusting the solids content of a ground limestone calcium carbonate from Omya SAS, Orgon having a mass based median particle size of 1.3 μm, as determined by sedimentation, such that a solids content of 10 wt.-%, based on the total weight of the aqueous suspension, is obtained.

Whilst mixing the slurry at a speed of 6.2 m/s, 11.2 kg phosphoric acid was added in form of an aqueous solution containing 30 wt.-% phosphoric acid to said suspension over a period of 20 minutes at a temperature of 70° C. After the addition of the acid, the slurry was stirred for additional 5 minutes, before removing it from the vessel and drying using a jet-dryer.

Preparation of the Sheet-Like Element

A sodium neutralised polyacrylate dispersing agent (9.8 g, 42% solid content) was dispersed in water (284 mL) and the SRCC (205.8 g) was added step by step until the a homogeneous formulation was obtained. Polyacrylate binder Acronal D500 (45.6 g, 46 wt.-% solid content) was adjusted to pH 9 with NaOH 30 wt.-% and added to the previous solution to obtain a coating composition. Before use, the coating composition was stirred for 5 minutes to achieve a homogeneous distribution of the components of the coating composition. Afterwards, the coating composition was coated with a coating table RK303 multicoater (Erichsen) onto a PET film Hostaphan RN 100 μm (PützFolie, Germany) and dried with a S-Dryer machine (Durrer, Switzerland) to obtain a coating weight of 50 g/m$^2$. The pore volume of the coating is given in Table 1.

TABLE 1

Pore volume of the obtained sheet-like element.

| | Total intruded specific pore volume | Total intra particle intruded specific pore volume | Total inter particle intruded specific pore volume | Total occlusion pore volume |
|---|---|---|---|---|
| Value | 0.667 cm$^3$/g | 0.301 cm$^3$/g | 0.258 cm$^3$/g | 0.108 cm$^3$/g |
| Applied pore size range | 0.004-208 μm | 0.004-0.67 μm | 0.67-10 μm | 10-208 μm |

Essential Oils (EOs)

Rosemary EO Morocco (*Rosmarinus officinalis* leaf oil) and Thyme red EO Hungary (*Thymus vulgaris* flower/Leaf oil) were extracted by steam distillation method and purchased from BERNARDI GROUP (France). All EOs were stored in the dark at 21±1° C. and utilised before the expiration date.

Preparation Inoculum for In-Vitro and Food Antimicrobial Activity Tests

Gram-positive bacteria *Listeria innocua* (ATCC 33039, a *Listeria monocytogenes* surrogate) was selected for the evaluation of the antimicrobial activity of FCCs loaded with EO in in-vitro tests, food tests in petri dishes and food tests under real packaging conditions. Overnight cultures of *L. innocua* were prepared in 10 ml Brain Heart Infusion Broth (BHI) (Biolife, Italy) at 37° C. for 12-18 hours for in-vitro tests and for food tests at 7° C. in BHI broth for 5 to 7 days. After cold adaption, each culture was centrifuged at 4000 rpm for 2 min at room temperature in a Sigma 3-18K centrifuge. The centrifugation pellets were washed 2 times with 8 ml of 0.1% peptone water including 0.85% NaCl (diluting solution) and recentrifuged. After washing and centrifugation, the cultures were resuspended in the diluting solution. The concentrations of microorganisms were determined with a Neubauer improved counting chamber (0.1 mm×0.0025 mm) and afterwards diluted to a final concentration of 107 cfu/ml for in-vitro tests, food tests in petri dishes and real packaging tests with high inoculum and 104 cfu/ml or 103 cfu/ml for real packaging tests with low inoculum.

Statistical Analysis

All results are expressed as means±standard deviation (SD). The data were analysed by one-factorial analysis of variance (ANOVA) with statistical software package R, version 3.6.1. In order to detect differences between specific factor levels, a post-hoc analysis with error inflation correction following Tukey HSD was applied. If the data were not normally distributed, Kruskal-Wallis, a pairwise Wilcoxon test, was performed. Statistically significant differences were assumed if P<0.05.

Example 1: In-Vitro Antimicrobial Activity Tests

An inoculum concentration of 104 cfu/mL *L. innocua* in sterile water was adjusted for in-vitro antimicrobial activity test by adding 1 ml of the 107 cfu/ml suspension (overnight culture) to 1 L of sterile water. 100 mL of the inoculum was sterile filtered through a cellulose nitrate filter with a pore size of 0.45 μm (Sartorius Stedim Biotech GmbH, Germany) for every test to adjust the initial concentration to 106 cfu/filter. Afterwards, cellulose nitrate filters were transferred in sterile plastic petri dishes with 60 mm diameter (Eppendorf, Germany) on Tryptone Soya Agar (TSA) (Oxoid, UK). The sheet-like elements (Ø50 mm) were loaded homogeneously with 5 wt.-%, 10 wt.-% or 30 wt.-% rosemary EO or thyme EO by a spraying system (E2-EUR Series, Nordson Switzerland). These sheet-like elements loaded with EO and the untreated sheet-like elements (negative control) were placed in the lid of each petri dish to avoid direct contact. The headspace volume was approximately 20 cm3. Then petri dishes were sealed with a rubber ring, wrapped with Parafilm and packed individually in PET ax/PE high barrier bags (Wipf AG, Switzerland) with a volume of max. 250 cm3 for incubation at 7° C. for 1 or 6 days. After the incubation period, cellulose filters were removed from TSA, transferred into 10 mL BHI broth and vortexed for 15 minutes at room temperature. The antimicrobial activity of the sheet-like elements loaded with EO were determined by detecting colony forming units by spread-plate method using BHI agar after an incubation of approximately 24 h at 37° C. Microbiological counts were expressed as logarithms of the number of cfu per filter (log cfu/filter). All tests were performed in fivefold.

The results are summarized in FIG. 1. It could be shown that with increasing EO loading the antimicrobial activity could be increased. After 6 days no *L. innocua* load could be detected in samples with a thyme EO loading of 30 wt.-%.

Example 2: Antimicrobial Food Tests in Petri Dishes

Sliced cooked chicken breast (chicken breast meat, nitrite salting mix, seasoning mix, glucose syrup, glucose, maltodextrin, sugar, yeast extract, thickening agent: E407a, locust bean gum, stabilizer: E450, antioxidant: E301, aroma) (Optigal Pouletbrust) were delivered freshly packed under modified atmosphere by Micarna SA, Switzerland. Samples from each slice of the tested meat products with a diameter of 60 mm (3.1-3.2 g) were cut out and transferred in sterile plastic petri dishes with 60 mm diameter (Eppendorf, Germany). 0.1 ml of the inoculum containing 107 cfu/ml *L. innocua* was spread over the sliced cooked chicken breast. The sheet-like elements (Ø50 mm) were loaded with 30 wt.-% rosemary EO or thyme EO by dripping. Afterwards these sheet-like elements loaded with EOs and the untreated sheet-like elements (negative control) were placed in the lid of each petri dish to avoid direct contact. The headspace volume was adjusted to approximately 19.5 cm3. Then, the petri dishes were sealed with a rubber ring, wrapped with Parafilm and packed individually in PET ax/PE high barrier bags (Wipf AG, Switzerland) with a volume of max. 250 cm3 for incubation at 7.5° C.±0.4° C. for 1 or 6 days. The microbial load of *L. innocua* was detected on ALOA plates according the method as follows.

Meat samples were diluted 1:10 with Half Fraser Broth (Biokar Diagnostics, France) and homogenized for 120 s at 300 rpm using a stomacher (Seward Stomacher 400 circulator). Afterwards, the microbial load of all samples was determined by a cultural spread-plate method after serial dilutions on Agar *Listeria* acc. by Ottaviani & Agosti (ALOA) (Oxoid, UK). Additionally, the initial microbial loading and the recovery rate of bacteria was detected 1 hour after sample preparation (t0). Microbiological counts were expressed as logarithms of the number of cfu per gram (log cfu/g). All tests were performed in triplicates.

The results are summarized in Table 2. As can be gathered, the use of the sheet-like element loaded with the antimicrobial active composition was able to reduce the growth of *L. innocua* during storage over a course of 6 days.

TABLE 2

Antimicrobial activity of the sheet-like elements with 30% rosemary EO loading, 30% thyme EO and untreated (negative control) in food tests in petri dishes on the growth of *L. innocua*. Results are expressed as log mean (log cfu/g)) ± standard deviation.

| Storage (days) | Sheet-like element (untreated) | Sheet-like element + rosemary EO | Sheet-like element + thyme EO |
|---|---|---|---|
| 0 | 5.76 ± 0.06 | 5.76 ± 0.06 | 5.76 ± 0.06 |
| 1 | 6.14 ± 0.06 | 5.89 ± 0.11 | 6.12 ± 0.01 |
| 6 | 8.53 ± 0.12 | 6.73 ± 0.25 | 7.94 ± 0.16 |

Example 3: Antimicrobial Activity Tests Under Real Packaging Conditions with Sheet-Like Elements Loaded with EO by Dripping To evaluate the antimicrobial activity under real packaging conditions, 56.7 g±1.74 g sliced cooked chicken breast (Micarna SA, Switzerland) was packed in packaging trays (PS-EVOH-PE with peel, 0.5 mm, 204×147×14 mm, Stager & Co AG, Muri, Switzerland). Headspace of a package was determined as 281.14 cm3 (product/headspace ratio was 1:4). A 0.018 m2 large sheet-like element was fixed on a high barrier lidding film (Ecoweb M-Pap 57 AF, 57 m, Sudpack, Germany) using an adhesive layer and was loaded with 30 wt.-% of rosemary EO by dripping prior to sealing of the package. Afterwards, trays were immediately packed under normal atmosphere (NA) and modified atmosphere (MA, 50% CO2, 50% N2) using a tray sealer (T 200, Multivac, Switzerland). As negative control, sliced cooked chicken breast was packed without the sheet-like element. After packaging, each top slice of the cooked chicken breast was inoculated with 0.1 ml of the inoculum containing 107 cfu/ml (FIG. 2) or 104 cfu/ml (FIG. 3) of *L. innocua* using a syringe through an airtight septum. Afterwards, all samples were stored at 7.7±1.2° C. for 21 days. After 1, 6, 12 and 21 days of storage, the microbial load of *L. innocua* was detected on ALOA plates according the method as follows.

Meat samples (top slice) were diluted 1:10 with Half Fraser Broth (Biokar Diagnostics, France) and homogenized for 120 s at 300 rpm using a stomacher (Seward Stomacher 400 circulator). Afterwards, the microbial load of all samples was determined by a cultural spread-plate method after serial dilutions on Agar *Listeria* acc. to Ottaviani & Agosti (ALOA) (Oxoid, UK). Additionally, the initial microbial loading and the recovery rate of bacteria was detected 1 hour after sample preparation (t0). Microbiological counts were expressed as logarithms of the number of cfu per gram (log cfu/g). All tests were performed in triplicates.

Figure 2:
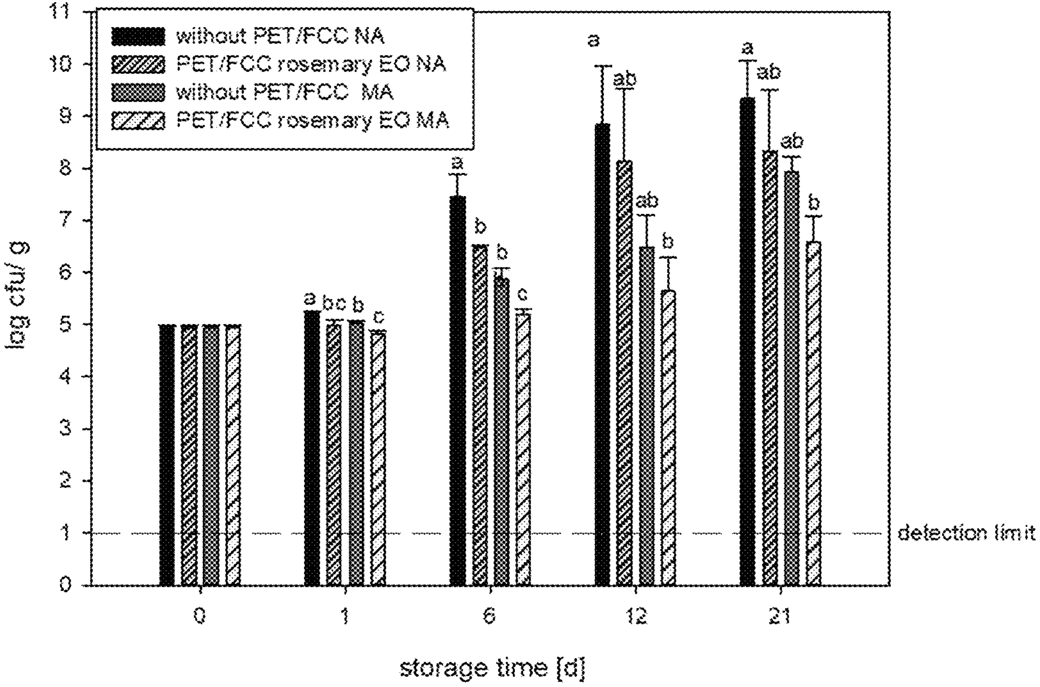
FIG. 2 shows the results of antimicrobial activity tests of the sheet-like elements loaded with essential oil in combination with modified atmosphere packaging with microbiological counts expressed as logarithms of the number of cfu per gram (log cfu/g).
Figure 3:
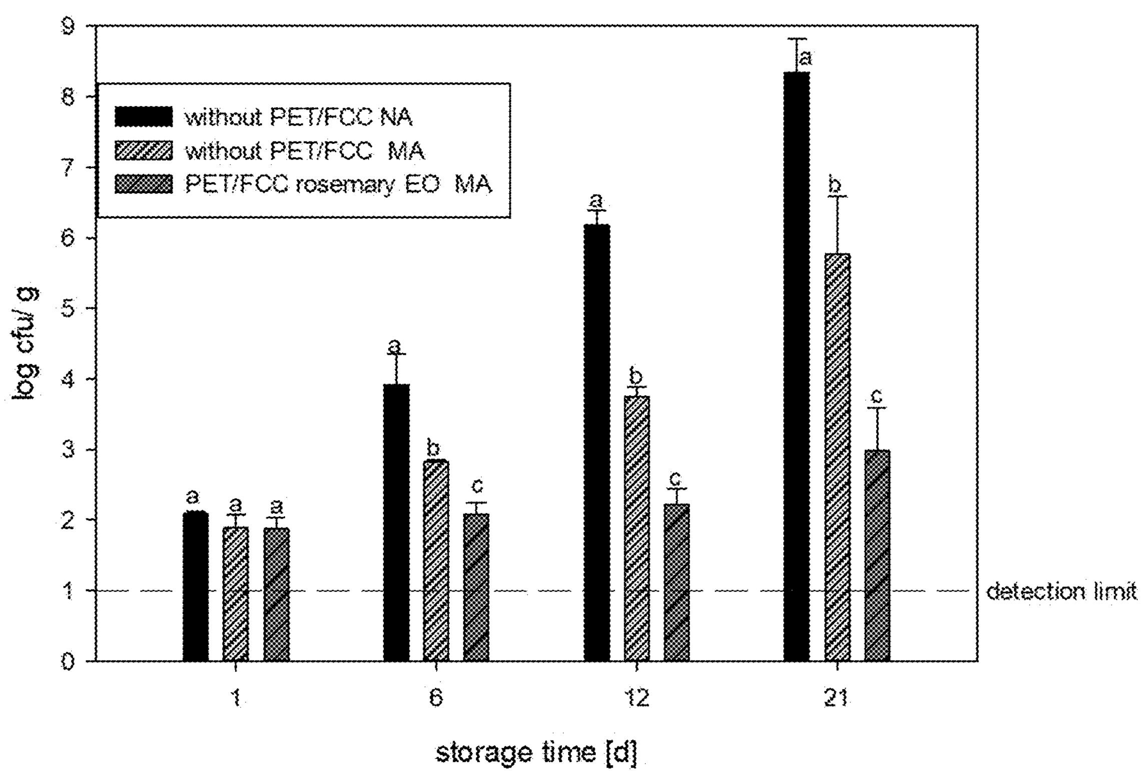
FIG. 3 shows the results of antimicrobial activity tests of the sheet-like elements loaded with essential oil (dipping) under real packaging conditions with microbiological counts expressed as logarithms of the number of cfu per gram (log cfu/g).

The results are summarized in FIG. 2 and FIG. 3, respectively. As can be seen, only a slight growth of *L. innocua* was observed after 21 days of storage in packages loaded with a sheet-like element loaded with rosemary EO in combination with modified atmosphere packaging. Under real packaging conditions (FIG. 3), the amount of microbial contamination was maintained below the limit of 3.3 log cfu/g, as required by the European Food Safety Agency (EFSA).

Example 4: Antimicrobial Activity Tests Under Real Packaging Conditions with Sheet-Like Elements Loaded with EO by Spraying To evaluate the antimicrobial activity under real packaging conditions, 56.7 g±1.74 g sliced cooked chicken breast (Micarna SA, Switzerland) was packed in packaging trays (PS-EVOH-PE with peel, 0.5 mm, 204×147×14 mm, Stäger & Co AG, Muri, Switzerland). Headspace of a package was determined as 281.14 cm3 (product/headspace ratio was 1:4). A 0.018 m2 large sheet-like element was fixed on a high barrier lidding film (Ecoweb M-Pap 57 AF, 57 m, Sudpack, Germany) using an adhesive layer and was loaded with 30 wt.-% of rosemary EO by a spraying system (E2-EUR Series, Nordson Switzerland). Afterwards, trays were immediately packed under normal atmosphere (NA) and modified atmosphere (MA, 50% CO2, 50% N2) using a tray sealer (T 200, Multivac, Switzerland). As negative control, sliced cooked chicken breast was packed with the sheet-like element without EO loading. After packaging, each top slice of the cooked chicken breast was inoculated with 0.1 ml of the inoculum containing 103 cfu/ml (FIG. 4) of *L. innocua* using a syringe through an airtight septum. Afterwards, all samples were stored at 7° C. for 12 days. After 6 and 12 days of storage, the microbial load of *L. innocua* was detected on ALOA plates according the method as follows.

Meat samples (top slice) were diluted 1:10 with Half Fraser Broth (Biokar Diagnostics, France) and homogenized for 120 s at 300 rpm using a stomacher (Seward Stomacher 400 circulator). Afterwards, the microbial load of all samples was determined by a cultural spread-plate method after serial dilutions on Agar *Listeria* acc. to Ottaviani & Agosti (ALOA) (Oxoid, UK). Additionally, the initial microbial loading and the recovery rate of bacteria was detected 1 hour after sample preparation (t0). Microbiological counts were expressed as logarithms of the number of cfu per gram (log cfu/g). All tests were performed in single.

Figure 4:
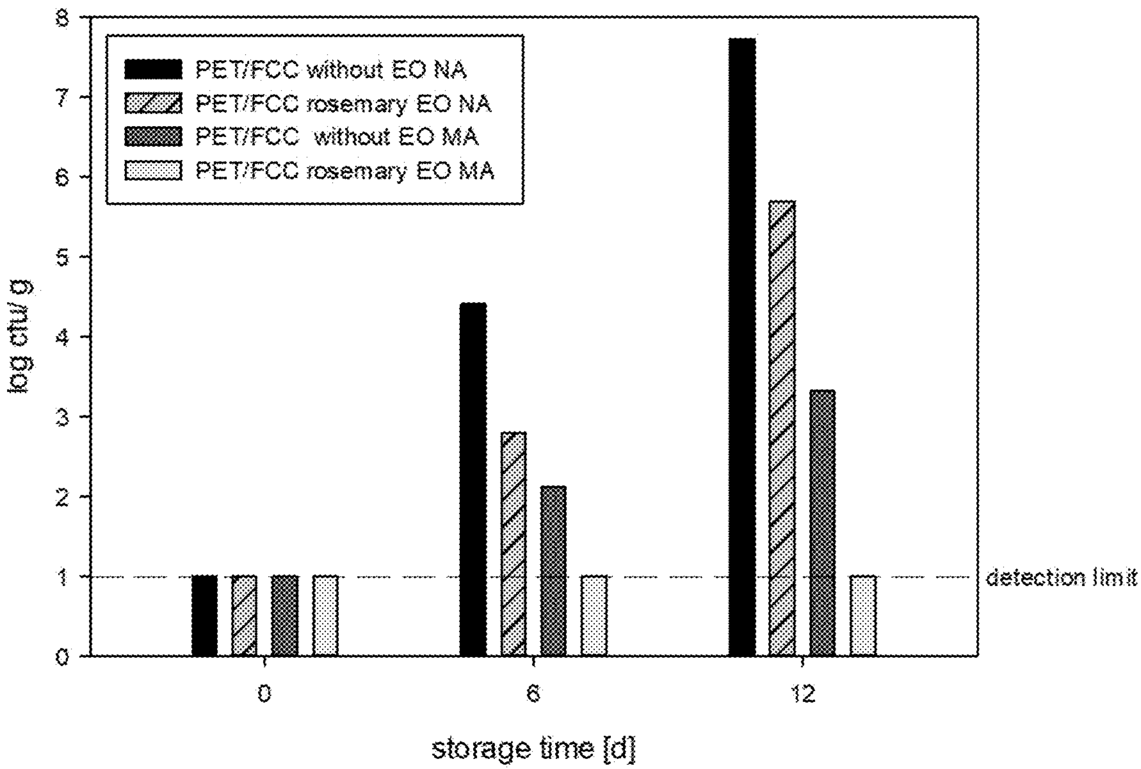
FIG. 4 shows the results of antimicrobial activity tests of the sheet-like elements loaded with essential oil (spraying) under real packaging conditions with microbiological counts expressed as logarithms of the number of cfu per gram (log cfu/g).

The results are shown in FIG. 4. It could be shown that by using the sheet-like element loaded with rosemary EO during 12 days of storage, the growth of *L. innocua* in sliced cooked chicken breast packages packed under modified atmosphere could be inhibited. The microbial load was below the detection limit.

Figure 5:
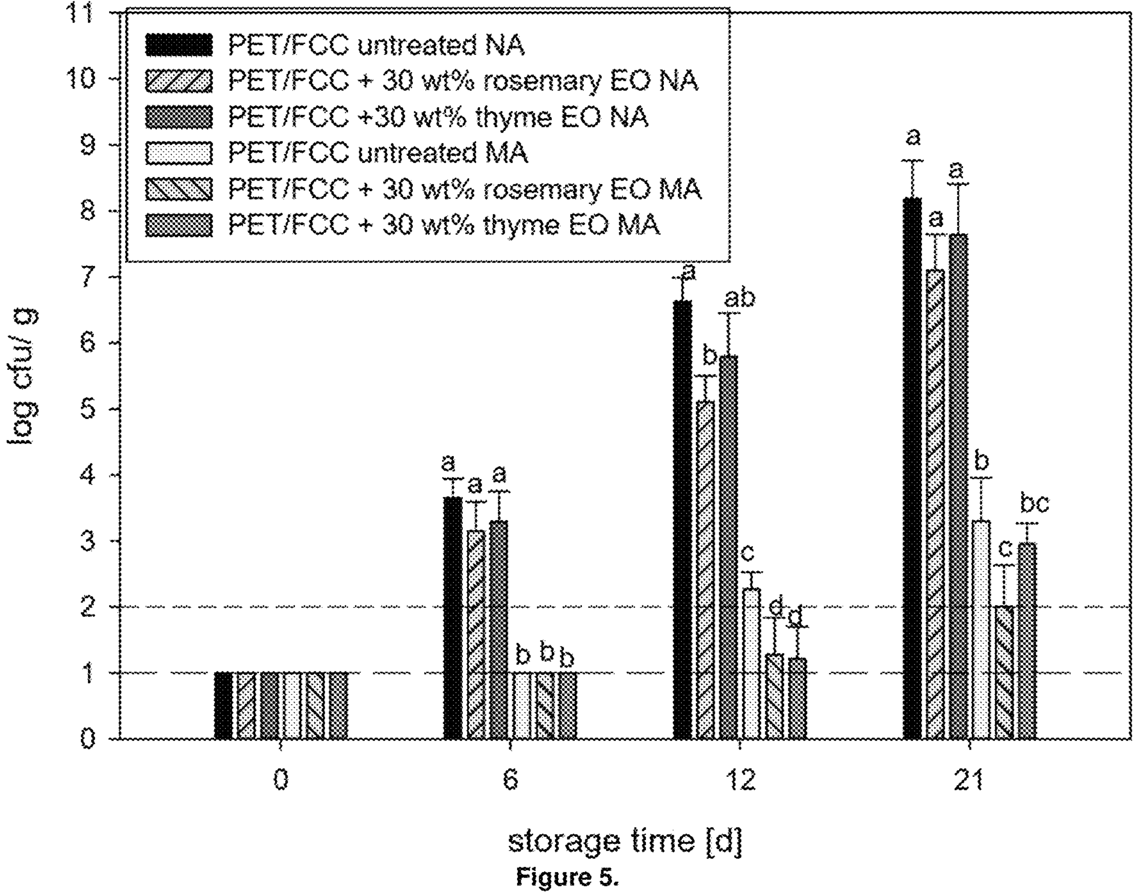
FIG. 5 shows the results of antimicrobial activity tests of the sheet-like elements loaded with essential oil (spraying) under real packaging conditions with microbiological counts expressed as logarithms of the number of cfu per gram (log cfu/g).

Example 5: Antimicrobial Activity Tests Under Real Packaging Conditions with Ham The tests of example 4 were repeated, except that 100 g ham were used instead of the sliced cooked chicken breast. The headspace volume was determined as 221.45 cm3 (product/headspace ratio was 1:2.2). The sheet-like elements were loaded with (a) rosemary EO or (b) thyme EO, and stored at 7° C. under (i) normal atmosphere (NA) or (ii) modified atmosphere (MA, 50% CO2, 50% N2). The results are summarized in FIG. 5. As can be seen, using the sheet-like element loaded with rosemary EO or thyme EO reduced the microbial growth, compared to storage without the antimicrobial active composition. In particular, when using the inventive sheet-like elements comprising either rosemary EO or thyme EO in combination with MA, microbial growth can be essentially completely inhibited during storage for 6 days and remains below the required limit of 3.3 cfu/g even after 21 days of storage.

Example 6: Antimicrobial Activity Tests Under Real Packaging Conditions with Bread Buns Bread buns were packed individually in packaging trays. A sheet-like element (10×15 cm, amount of coating layer: 50 g/m2) was loaded with 30 wt.-% of (a) clove EO or (b) thyme EO by a spraying system (E2-EUR Series, Nordson Switzerland) and placed into the packaging trays. Afterwards, trays were immediately packed under (i) normal atmosphere (NA) or (ii) modified atmosphere (MA, 30% CO2, 2% O2, 68% N2) using a tray sealer (T 200, Multivac, Switzerland; headspace volume: 670 mL, volume ratio of product to headspace:about 1:3). As negative control, bread buns were packed with the sheet-like element without EO loading. Ten samples were prepared each. Afterwards, the packaged buns were inoculated with 100 µl of an inoculum containing 103 spores per ml of *Rhizopus stolonifer* (MUCL 14025), which was distributed on three different spots using a syringe through an airtight septum. All samples were stored at 23° C. and inspected regularly for visible mold growth.

The results are shown in Table 3. As can be seen, using the sheet-like element loaded with essential oils markedly retarded the occurrence of visible mold on the inoculated bread buns under normal atmosphere. A mold-free shelf life extension of 3-4 days can be achieved by the use of the sheet-like element with thyme EO.

TABLE 3

Antimicrobial activity of the sheet-like elements with 30% clove EO loading, 30% thyme EO and untreated (negative control) in food tests on the growth of *R. stolonifer* in food trays containing inoculated buns packed under normal atmosphere.

| | Amount of moldy samples | | |
|---|---|---|---|
| Storage (days) | Sheet-like element (untreated) | Sheet-like element + clove EO | Sheet-like element + thyme EO |
| 0 | 0 | 0 | 0 |
| 1 | 0 | 0 | 0 |
| 2 | 10 | 5 | 0 |
| 3 | 10 | 8 | 0 |
| 4 | 10 | 9 | 0 |
| 6 | 10 | 10 | 7 |

With the buns packed under modified atmosphere, the first visible mould in the bread buns packed with the untreated sheet-like element was detected after 5 days. By using the sheet-like element loaded with thyme or clove EO, the mould-free shelf life can be significantly extended. Even after 31 days, no visible mould is detectable in these samples (Table 4).

TABLE 4

Antimicrobial activity of the sheet-like elements with 30% clove EO loading, 30% thyme EO and untreated (negative control) in food tests on the growth of *R. stolonifer* in food trays containing inoculated buns packed under modified atmosphere.

| | Amount of moldy samples | | |
|---|---|---|---|
| Storage (days) | Sheet-like element (untreated) | Sheet-like element + clove EO | Sheet-like element + thyme EO |
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 1 | 0 | 0 |
| 6 | 4 | 0 | 0 |
| 7 | 5 | 0 | 0 |
| 8 | 7 | 0 | 0 |
| 9 | 10 | 0 | 0 |
| 31 | 10 | 0 | 0 |

The invention claimed is:

1. A sheet-like element suitable for use in a food packaging, the sheet-like element comprising:

a) a coating layer comprising a cohesive coating, said cohesive coating comprising:

a.1) 100 parts by weight of a particulate filler comprising an untreated surface-reacted calcium carbonate in an amount of at least 50 wt.-%, based on the total amount of the particulate filler, wherein the untreated surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the untreated surface-reacted calcium carbonate has a specific surface area in the range from 20 to 200 $m^2/g$, as measured by the BET method, a.2) 0.1 to 10 parts by weight of a dispersant, and a.3) 8 to 30 parts by weight of a polymeric binder; and b) a substrate layer, wherein the coating layer is an evenly distributed coating layer on the substrate layer and adheres to the substrate layer, thereby forming the sheet-like element, and wherein the coating layer has (i) a total intruded specific pore volume in the range from 0.25 to 2 cm3/g, as measured by mercury intrusion porosimetry and (ii) a fluid receptivity in the range from 1 to 50 wt.-%, based on the total weight of the coating layer.

2. The sheet-like element of claim 1, wherein the coating layer has a total intruded specific pore volume in the range from 0.4 to 1.5 $cm^3/g$, as measured by mercury intrusion porosimetry, and/or has a total intra particle intruded specific pore volume in the range from 0.05 to 1.0 $cm^3/g$, as measured by mercury intrusion porosimetry, and/or has a total inter particle intruded specific pore volume in the range from 0.05 to 0.5 $cm^3/g$, as measured by mercury intrusion porosimetry, and/or has a total occlusion intruded specific pore volume in the range from 0.05 to 0.4 $cm^3/g$, as measured by mercury intrusion porosimetry, and/or is present on the substrate layer in an amount from 1 to 70 g/m2.

3. The sheet-like element of claim 1, wherein the particulate filler comprises the untreated surface-reacted calcium carbonate in an amount of at least 70 wt.-%, based on the total weight of the particulate filler, and wherein any optionally present further particulate filler material is selected from the group consisting of dolomite, ground calcium carbonate, precipitated calcium carbonate, magnesium hydroxide, talc, gypsum, titanium dioxide, kaolin, silicate, mica, barium sulphate, calcined clay, non-calcined (hydrous) clay, bentonite and mixtures thereof.

4. The sheet-like element of claim 1, wherein the untreated surface-reacted calcium carbonate has a specific surface area in the range from 50 to 120 $m^2/g$, as measured by the BET method, and/or has a total intra particle intruded specific pore volume in the range from 0.1 to 2.5 $cm^3/g$, as measured by mercury intrusion porosimetry.

5. The sheet-like element of claim 1, wherein the dispersant is selected from polyacrylic acid having a molecular weight in the range of 1000 to 15000 g/mol, salts thereof, derivatives thereof, starch, carboxymethyl cellulose or mixtures thereof.

6. The sheet-like element of claim 1, wherein the polymeric binder is selected from the group consisting of polyacrylic acid, salts thereof, derivatives thereof, starch, proteins, styrene butadiene latices, polyvinyl alcohol, polyvinyl acetate and mixtures thereof.

7. The sheet-like element of claim 1, wherein the substrate layer comprises one or more individual substrate layers selected from the group consisting of polymer material layers, fibrous material layers, paper layers, cardboard layers, textile layers, nonwoven layers, layers made from bio-based materials, wood layers, bamboo layers, metal foil layers, aluminum layers, print receptive coating layers, and mixtures of the foregoing, wherein the one or more individual substrate layers optionally have been subjected to a corona treatment.

8. The sheet-like element of claim 1, further comprising:

one or more adhesive layers, being located on the substrate layer on an opposite side of the coating layer and/or between the individual substrate layers, wherein the one or more adhesive layers is selected from the group consisting of adhesives, sealants, rubber coatings, pressure-sensitive layers and mixtures of the foregoing; and/or one or more primer layers, being located between the substrate layer and the coating layer, and/or one or more breathable covering layers to permanently cover the coating layer, selected from the group consisting of breathable film layers, fibrous material layers and nonwoven fabric layers, and/or one or more protective layers to temporarily seal the coating layer, and/or one or more adhesive layers, selected from the group consisting of polyethylene, polypropylene and coated paper.

9. The sheet-like element of claim 1, wherein the coating layer is loaded with an antimicrobial active composition comprising at least one antimicrobial active ingredient having a vapor pressure in the range from 1 to 500 Pa at 25° C., wherein the antimicrobial active composition is loaded in an amount from 1 to 50 wt.-%, based on the total weight of the coating layer.

10. The sheet-like element of claim 9, wherein the antimicrobial active composition comprises at least one essential oil, wherein the at least one essential oil is selected from the group consisting of cinnamon essential oil, thyme essential oil, clove essential oil, rosemary essential oil, oregano essential oil, orange essential oil, carrot seed essential oil, ginger essential oil, lemongrass essential oil, bay leaf essential oil, marjoram essential oil, mustard essential oil and mixtures thereof, and comprises at least one viscosity modifier, wherein the at least one viscosity modifier is selected from the group consisting of guar gum, starch, cellulose, carboxymethyl cellulose, locust bean gum, xanthan gum, pectin, carrageenan, agar, salts thereof, derivatives thereof and mixtures thereof.

11. The sheet-like element of claim 3, wherein the particulate filler consists of the untreated surface-reacted calcium carbonate and the optionally present further particulate filler material.

12. The sheet-like element of claim 1, wherein the polymeric binder is an alkali-swellable binder.

13. The sheet-like element of claim 1, wherein the coating layer is present on the substrate layer in an amount from 1 to 70 $g/m^2$.

* * * * *